US012755693B2

(12) United States Patent
Kuang et al.

(10) Patent No.: US 12,755,693 B2
(45) Date of Patent: Oct. 6, 2026

(54) PIXEL DRIVING CIRCUIT, DISPLAY PANEL AND DISPLAY DEVICE

(71) Applicant: Xiamen Tianma Display Technology Co., Ltd., Xiamen (CN)

(72) Inventors: Jian Kuang, Xiamen (CN); Yana Gao, Xiamen (CN); Xingyao Zhou, Xiamen (CN)

(73) Assignee: Xiamen Tianma Display Technology Co., Ltd., Xiamen (CN)

( * ) Notice: Subject to any disclaimer, the term of this patent is extended or adjusted under 35 U.S.C. 154(b) by 0 days.

(21) Appl. No.: 18/763,913

(22) Filed: Jul. 3, 2024

(65) Prior Publication Data

US 2025/0322792 A1 Oct. 16, 2025

(30) Foreign Application Priority Data

Apr. 11, 2024 (CN) ......................... 202410437255.8

(51) Int. Cl.
*G09G 3/3233* (2016.01)

(52) U.S. Cl.
CPC ... *G09G 3/3233* (2013.01); *G09G 2300/0452* (2013.01); *G09G 2300/0852* (2013.01); *G09G 2300/0861* (2013.01); *G09G 2320/0242* (2013.01); *G09G 2320/0247* (2013.01)

(58) Field of Classification Search
CPC ......... G09G 3/3233; G09G 2300/0452; G09G 2300/0852; G09G 2300/0861; G09G 2320/0242; G09G 2320/0247
See application file for complete search history.

(56) References Cited

U.S. PATENT DOCUMENTS

2020/0320934 A1* 10/2020 Ma ........................ G09G 3/3258
2021/0158755 A1* 5/2021 Li ........................ G09G 3/3266
2022/0246094 A1* 8/2022 Qin ........................ G09G 3/3266
2023/0274690 A1* 8/2023 Jeong ........................ G09G 3/32
345/204
2024/0038148 A1* 2/2024 Park ........................ G09G 3/32
2024/0365607 A1* 10/2024 Park .................... H10K 59/1216
2024/0371321 A1* 11/2024 Zhang .................. G09G 3/3233

FOREIGN PATENT DOCUMENTS

CN 110070831 A 7/2019
CN 112908258 A 6/2021

* cited by examiner

*Primary Examiner* — Stacy Khoo
(74) *Attorney, Agent, or Firm* — Anova Law Group, PLLC

(57) ABSTRACT

A pixel driving circuit, a display panel and a display device are provided. The driving circuit includes a driving module, a voltage writing module and a potential coupling module. A first terminal of the driving module is electrically connected to a second node, a second terminal of the driving module is electrically connected to a third node, a first terminal of the voltage writing module is electrically connected to a preset potential signal line, a second terminal of the voltage writing module is electrically connected to the second node, a control terminal of the voltage writing module electrically connected to a first control signal line, a first terminal of the potential coupling module is electrically connected to the first control signal line, and a second terminal of the potential coupling module is electrically connected to at least one of the second node and the third node.

18 Claims, 21 Drawing Sheets

PIXEL DRIVING CIRCUIT, DISPLAY PANEL AND DISPLAY DEVICE

CROSS-REFERENCE TO RELATED APPLICATION

This application claims the priority of Chinese Patent Application No. 202410437255.8, filed on Apr. 11, 2024, the content of which is incorporated by reference in its entirety.

TECHNICAL FIELD

The present disclosure generally relates to the field of display technologies and, more particularly, relates to a pixel driving circuit, a display panel and a display device.

BACKGROUND

A pixel driving circuit in a display panel provides a driving current required for display to the light-emitting elements of the display panel such that the display panel emits light for display. When the pixel driving circuit is used for a long time, a driving module is used to provide the driving current for the light-emitting element. The driving module can determine the value of its driving current according to its gate potential, thereby controlling the gate voltage of the driving module to adjust the brightness of the light-emitting element. Because the drive module is controlled by a voltage for a long time, it will be affected by the bias potential, causing the drive module to be voltage biased, which affects the effect of controlling the light-emitting elements. Therefore, it is necessary to write a constant voltage to the driving module during the holding frame stage to reduce the biased voltage of the driving module. However, under the action of a constant voltage of the same potential, the light-emitting elements of different colors have different biasing effects on the driving module, which will lead to differences in the flicker performance of light-emitting elements of different colors, affecting the optimal adjustment of the flicker display and the display effect of display panel. The present disclosed pixel driving methods, display panels and display devices are direct to solve such a problem and other problems in the arts.

SUMMARY

One aspect of the present disclosure provides a pixel driving circuit. The driving circuit includes a driving module, a voltage writing module and a potential coupling module. A first terminal of the driving module is electrically connected to a second node, a second terminal of the driving module is electrically connected to a third node, a first terminal of the voltage writing module is electrically connected to a preset potential signal line, a second terminal of the voltage writing module is electrically connected to the second node, a control terminal of the voltage writing module electrically connected to a first control signal line, a first terminal of the potential coupling module is electrically connected to the first control signal line, and a second terminal of the potential coupling module is electrically connected to at least one of the second node and the third node.

Another aspect of the present disclosure includes a display panel. The display panel includes a light-emitting element and a plurality of pixel driving circuits. At least a partial number of the plurality of pixel driving circuits includes a driving module, a voltage writing module and a potential coupling module. A first terminal of the driving module is electrically connected to a second node, a second terminal of the driving module is electrically connected to a third node, a first terminal of the voltage writing module is electrically connected to a preset potential signal line, a second terminal of the voltage writing module is electrically connected to the second node, a control terminal of the voltage writing module electrically connected to a first control signal line, a first terminal of the potential coupling module is electrically connected to the first control signal line, and a second terminal of the potential coupling module is electrically connected to at least one of the second node and the third node.

Another aspect of the present disclosure includes a display device. The display device includes a display panel. The display panel includes a light-emitting element and a plurality of pixel driving circuits. Each of at least a partial number of the plurality of pixel driving circuits includes a driving module, a voltage writing module and a potential coupling module. A first terminal of the driving module is electrically connected to a second node, a second terminal of the driving module is electrically connected to a third node, a first terminal of the voltage writing module is electrically connected to a preset potential signal line, a second terminal of the voltage writing module is electrically connected to the second node, a control terminal of the voltage writing module electrically connected to a first control signal line, a first terminal of the potential coupling module is electrically connected to the first control signal line, and a second terminal of the potential coupling module is electrically connected to at least one of the second node and the third node.

Other aspects of the present disclosure can be understood by those skilled in the art in light of the description, the claims, and the drawings of the present disclosure.

BRIEF DESCRIPTION OF THE DRAWINGS

To illustrate the technical solutions in the embodiments of the present disclosure more clearly, the following briefly introduces the accompanying drawings used in the description of the embodiments. Obviously, the accompanying drawings in the following description are only some embodiments of the present disclosure, for those of ordinary skill in the art, other drawings can also be obtained from these drawings without creative effort.

DETAILED DESCRIPTION

Figure 1:
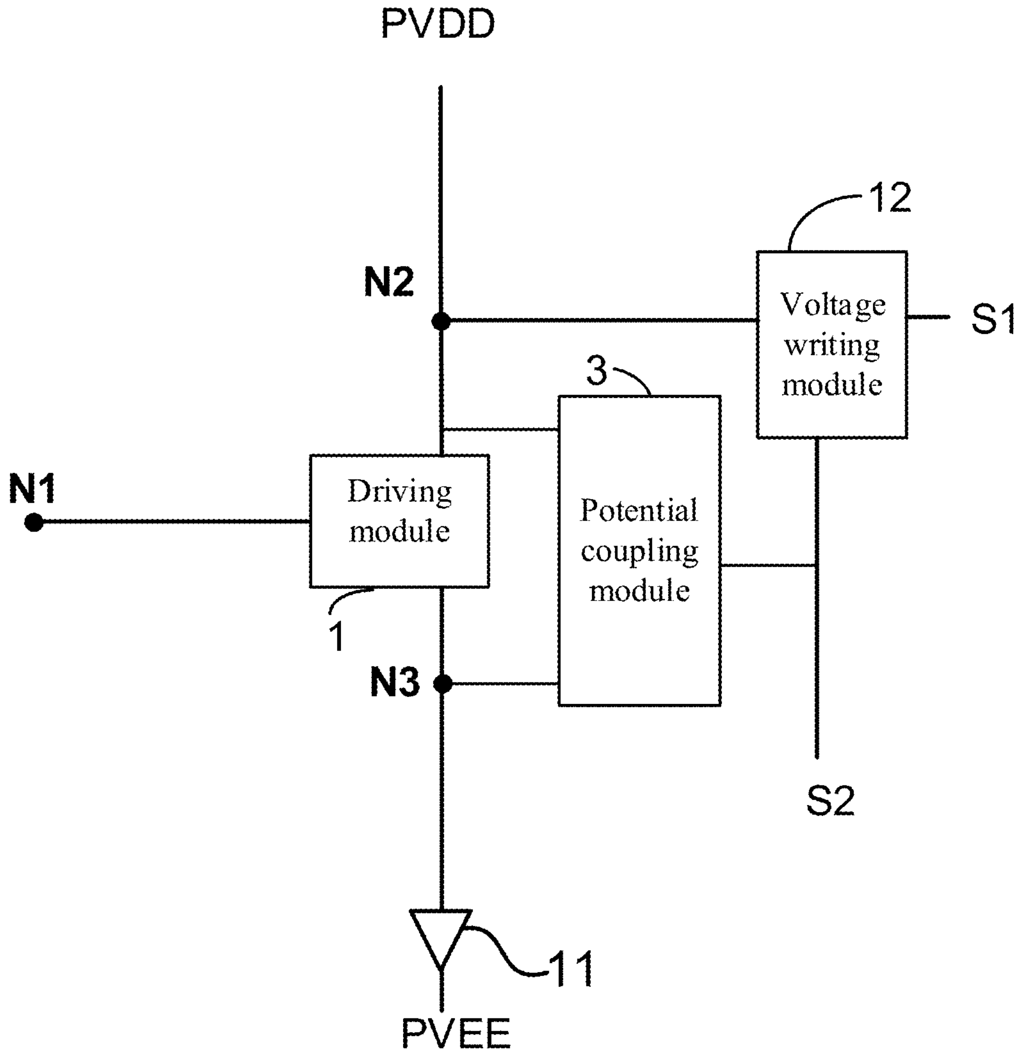
FIG. 1 illustrates an exemplary pixel driving circuit according to various disclosed embodiments of the present disclosure.

To understand the above objects, features and advantages of the present disclosure more clearly, the solutions of the present disclosure will be further described below. It should be noted that, as long as there is no conflict, the embodiments of the present disclosure and the features in the embodiments can be combined with each other.

Many specific details are set forth in the following description to fully understand the present disclosure, but the present disclosure can also be implemented in other ways different from those described here; obviously, the embodiments in the description are only part of the embodiments of the present disclosure, and not all examples.

In related technologies, when a display panel displays a certain picture, it needs to set a certain picture display time to ensure that the viewer fully realizes visual residue, thereby forming a continuous animation effect when refreshing multiple pictures. Therefore, for each picture displayed on the display panel, multiple frames need to be set, and the multiple frames are played in sequence to achieve a smooth display of the picture. Multiple frames may include a refresh frame and a holding frame. The refresh frame may provide the pixel driving circuit with the data signal corresponding to the display screen to drive the display, while the holding frame no longer writes data signals, but the display is performed based on the data signal saved when the frame is refreshed, and the display screen of the refresh frame is kept.

When the pixel driving circuit is used for a long time, the driving module is used to provide a driving current for the light-emitting element. The driving module can determine the value of its driving current according to its gate potential, thereby controlling the gate voltage of the driving module to adjust the driving of the brightness of the light-emitting element. Because the driving module is controlled by voltage for a long time, it will be affected by the bias potential, causing a voltage bias in the driving module, which affects the effect of controlling the light emission of the light-emitting element. Therefore, during the holding frame stage, the source/drain of the driving module is connected to the preset potential signal. The preset potential signal can raise the potential of the source/drain of the driving module for biasing (ON Bias Stress, OBS), improve the voltage bias of the driving module, correct and maintain the brightness in the frame stage to improve the flicker. The source/drain of the driving module of the light-emitting elements of different colors is connected to different data signals during the refresh frame stage, but the source/drain of the driving module is connected to the same preset potential signal during the holding frame stage, and the voltage of the control terminal of the driving module is different from the first terminal $Vgs=DATA+Vth-Vpark$. DATA is the voltage of the data signal connected to the refresh frame, Vth is the threshold voltage of the driving module, and Vpark is the voltage of the preset potential signal. The subsequently described embodiments can all be understood with reference to this. Therefore, the voltage Vgs between the control terminal and the first terminal of the driving module of the light-emitting elements of different colors is different, causing the bias effects of the light-emitting elements of different colors to be different, resulting in differences in the flicker performance of the light-emitting elements of different colors, affecting the optimized adjustment of the frequency flash and the display effect of the display panel.

To solve the above problems, the present disclosure provides a pixel driving circuit, a display panel and a display device. The pixel driving circuit may include a driving module. A first terminal of the driving module may be electrically connected to a second node, and a second terminal of the driving module may be electrically connected to a third node. The pixel driving circuit may also include a voltage writing module. A first terminal of the voltage writing module may be electrically connected to the preset potential signal line, a second terminal of the voltage writing module may be electrically connected to the second node, and a control terminal of the voltage writing module may be electrically connected to the first control signal line. The pixel driving circuit may also include a potential coupling module. A first terminal of the potential coupling module may be electrically connected to the first control signal line, and a second terminal may be electrically connected to at least one of the second node and the third node.

The voltage writing module may be configured to selectively conduct under the control of the first control signal provided by the first control signal line, and transmit the preset potential signal provided by the preset potential signal line to the first terminal of the driving module, e.g., the second node. The first control signal may include an enable level and a non-enable level. The enable level may turn on the voltage writing module, and the non-enable level may turn off the voltage writing module. When the first control signal controls the voltage writing module to be turned on, the voltage writing module may transmit the preset potential signal transmitted on the preset potential signal line to the first terminal of the driving module, which may be used in the bias phase of the holding frame to provide a preset potential signal to the driving module to raise the voltage of the first terminal and/or the second terminal of the driving module. Therefore, the potential coupling module may be used to raise the voltage of the first terminal and/or the second terminal of the driving module, and the raised potential of the second node and/or the third node may eliminate the difference in bias effect caused by the problem that light-emitting elements of different colors are connected to the same preset voltage. Accordingly, the resulting risk of flicker deterioration may be eliminated such that the light-emitting elements of different colors may be subject to a same degree of bias, optimizing the flicker performance of the display panel and improving the display effect of the panel.

FIG. 1 is a schematic structural diagram of an exemplary pixel driving circuit according to various disclosed embodiments of the present disclosure. As shown in FIG. 1, the pixel driving circuit may include a driving module 1, a voltage writing module 12 and a potential coupling module 3. To maintain the same bias effect of the light-emitting elements 11 of different colors in the frame stage, as shown in FIG. 1, one embodiment of the present disclosure may provide the potential coupling module. 3.

FIG. 1 exemplarily shows that a control terminal of the driving module 1 may be electrically connected to a first node N1; a first terminal of the potential coupling module 3 may be electrically connected to a first control signal line S2; and a second terminal of the potential coupling module 3 may be electrically connected both the second node N2 and the third node N3. The voltage writing module 12 may include, for example, a positive channel metal oxide semiconductor (P-channel metal oxide semiconductor, or PMOS) transistor. During the holding frame stage, when a first control signal is a low-level signal, the voltage writing module 12 may be turned on, and the preset potential signal Vpark transmitted on the preset potential signal line S1 may be written to the driving module 1. To eliminate the difference in the bias effect of the light-emitting elements 11 of different colors during the frame holding stage, the first control signal may be pulled up (raised) to a high-level signal, the voltage writing module 12 may be turned off, and the potential coupling module 3 may be connected to the high-level signal to pull up the potentials of both the second node N2 and the third node N3. The pulled-up potential on the second node N2 and the third node N2 may eliminate the difference in the bias effect caused by different light-emitting elements 11 being connected to the same preset potential signal. Thus, the risk of flicker deterioration may be eliminated; the flicker performance of the display panel may be improved; and the display effect of the display panel may be enhanced.

Figure 2:
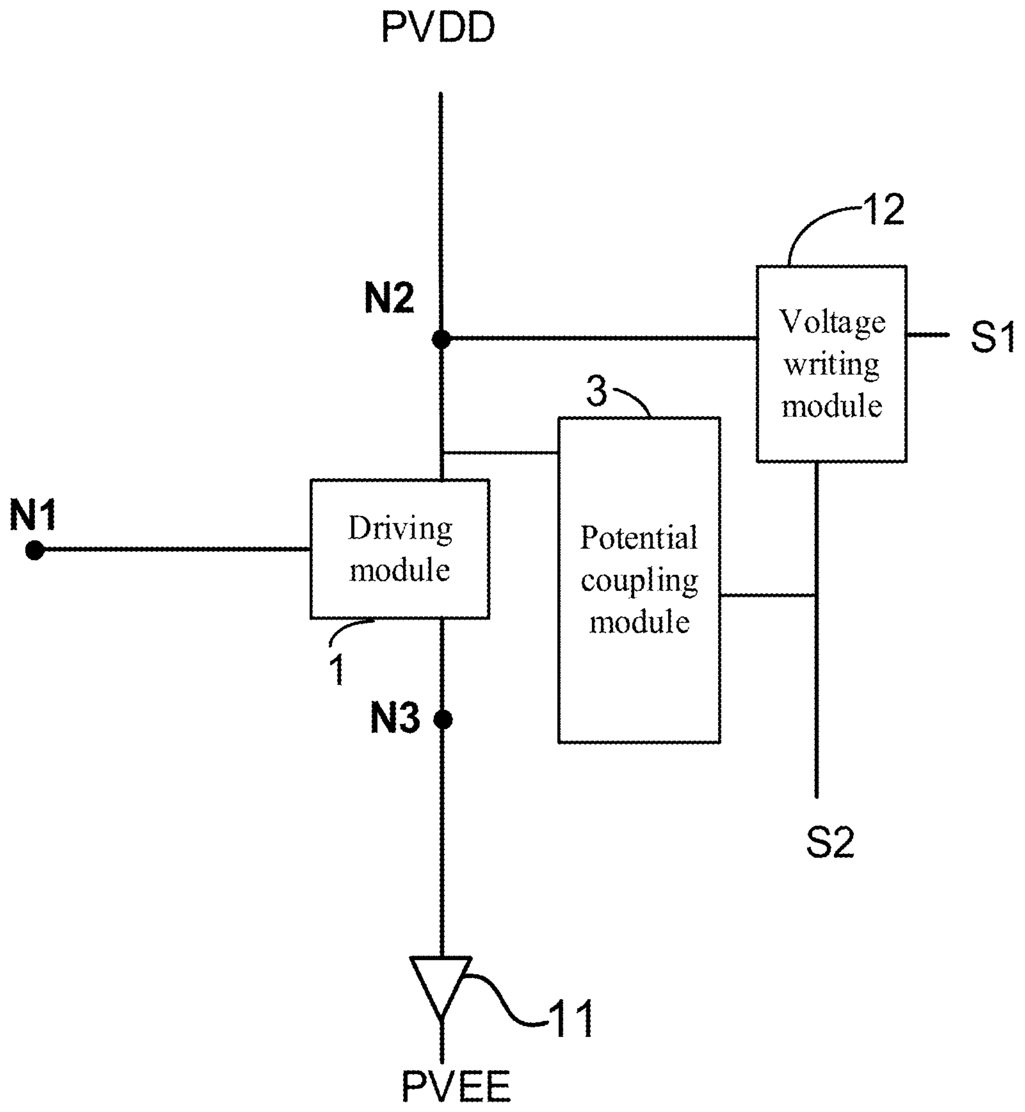
FIG. 2 illustrates another exemplary pixel driving circuit according to various disclosed embodiments of the present disclosure.

FIG. 2 is a schematic structural diagram of another exemplary pixel driving circuit according to various disclosed embodiments of the present disclosure. FIG. 2 exemplarily shows that the first terminal of the potential coupling module 3 may be electrically connected to the preset potential signal line S1. The second terminal of the potential coupling module 3 may be electrically connected to the second node N2. During the holding frame phase, when the first control signal is a low-level signal, the voltage writing module 12 may be turned on, and the preset potential signal transmitted on the preset potential signal line S1 may be written into the driving module 1. To eliminate the difference in the bias effect of light-emitting elements 11 of the different colors in the holding frame stage, the first control signal may be pulled up to a high-level signal, the voltage writing module 12 may be turned off, and the potential coupling module 3 may be connected to a high-level signal to pull up the potential of the second node N2. The pulled-up voltage on the second node N2 may eliminate the difference in bias caused by different light-emitting elements 11 being connected to the same preset potential signal, thereby eliminating the risk of flicker deterioration and optimizing the flicker performance of the display panel. Accordingly, the display effect of the display panel may be improved.

Figure 3:
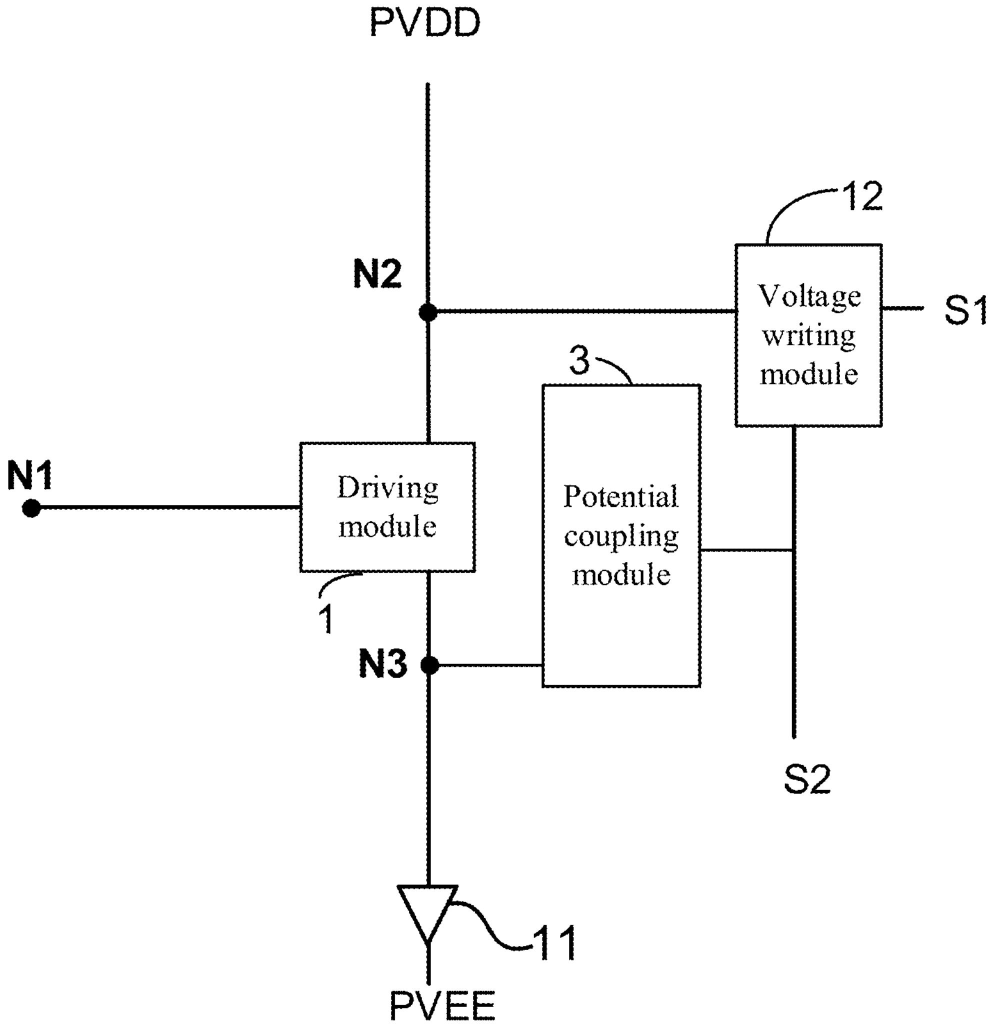
FIG. 3 illustrates another exemplary pixel driving circuit according to various disclosed embodiments of the present disclosure.

FIG. 3 is a schematic structural diagram of another exemplary pixel driving circuit according to various disclosed embodiments of the present disclosure. FIG. 3 exemplarily shows that the first terminal of the potential coupling module 3 may be electrically connected to the preset potential signal line S1. The second terminal of the potential coupling module 3 may be electrically connected to the third node N3. During the holding frame phase, when the first control signal is a low-level signal, the voltage writing module 12 may be turned on, and the preset potential signal transmitted on the preset potential signal line S1 may be written into the driving module 1. To eliminate the difference in bias effect of light-emitting elements 11 of different colors in the holding frame stage, the first control signal may be pulled up to a high level signal, the voltage writing module 12 may be turned off, and the potential coupling module 3 may be connected to a high-level signal to pull up the potential of the third node N3. The pulled-up potential of the third node N3 may eliminate the difference in bias caused by different light-emitting elements 11 being connected to the same preset potential signal, thereby eliminating the risk of flicker deterioration and optimizing the flicker performance of the display panel. Accordingly, the display effect of the display panel may be improved.

The embodiments of the present disclosure may utilize the potential coupling module 3 to pull-up the potential of the first terminal and/or the second terminal of the driving module 1, and the pulled-up potential of the second node N2 and/or the third node N3 may eliminate the difference in bias of different light-emitting elements 11 of different colors caused by connecting the different light-emitting elements of different colors to the same preset potential signal. Thus, the risk of flicker deterioration may be eliminated such that the light-emitting elements 11 of different colors may be subject to the same degree of bias, optimizing the flicker performance of the display panel, and also improving the display effect of the display panel.

It can be understood that the first node N1, the second node N2, and the third node N3 may be virtually existing connection nodes, or may be actual existing connection nodes, which is not limited in the embodiments of the present disclosure.

Figure 4:
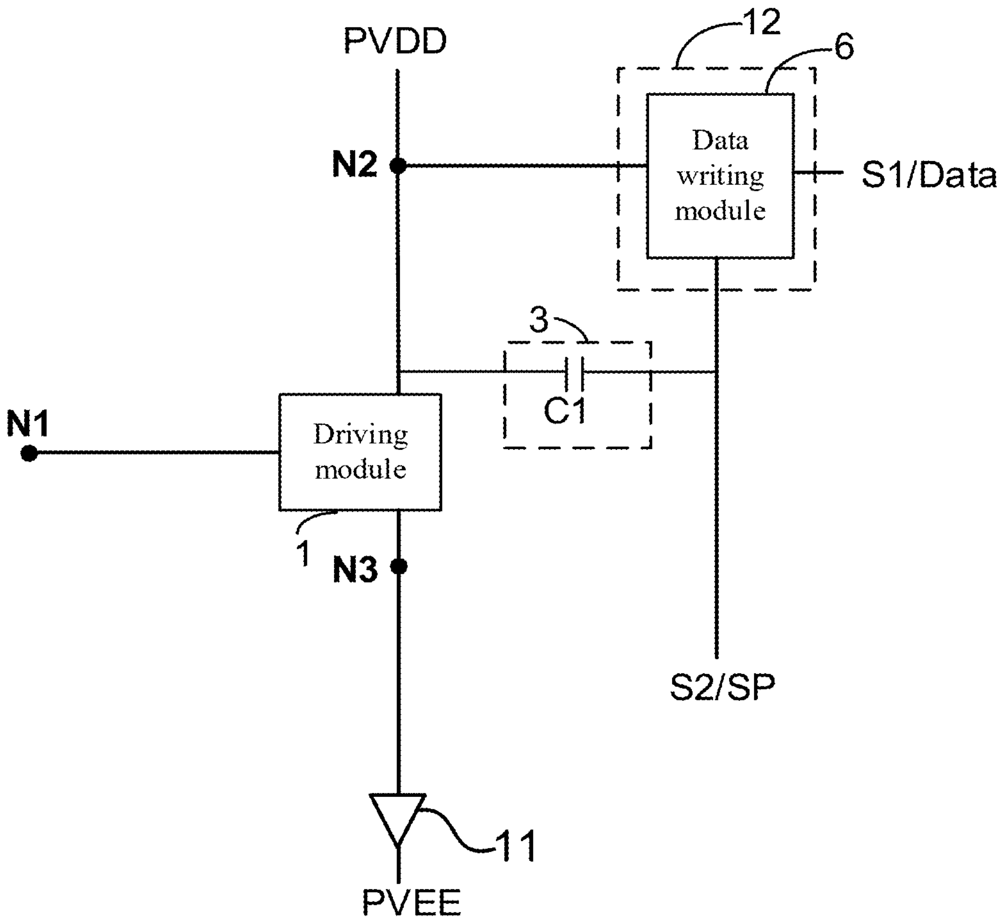
FIG. 4 illustrates another exemplary pixel driving circuit according to various disclosed embodiments of the present disclosure.
Figure 5:
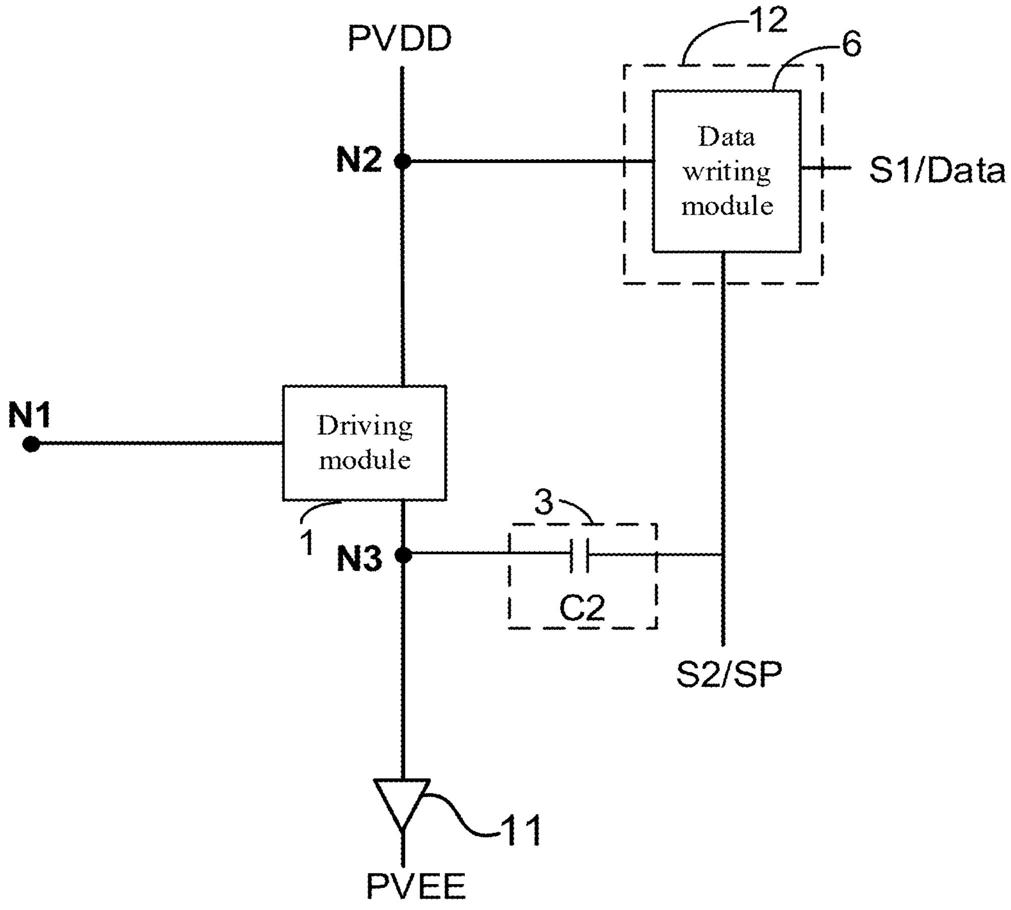
FIG. 5 illustrates another exemplary pixel driving circuit according to various disclosed embodiments of the present disclosure.
Figure 6:
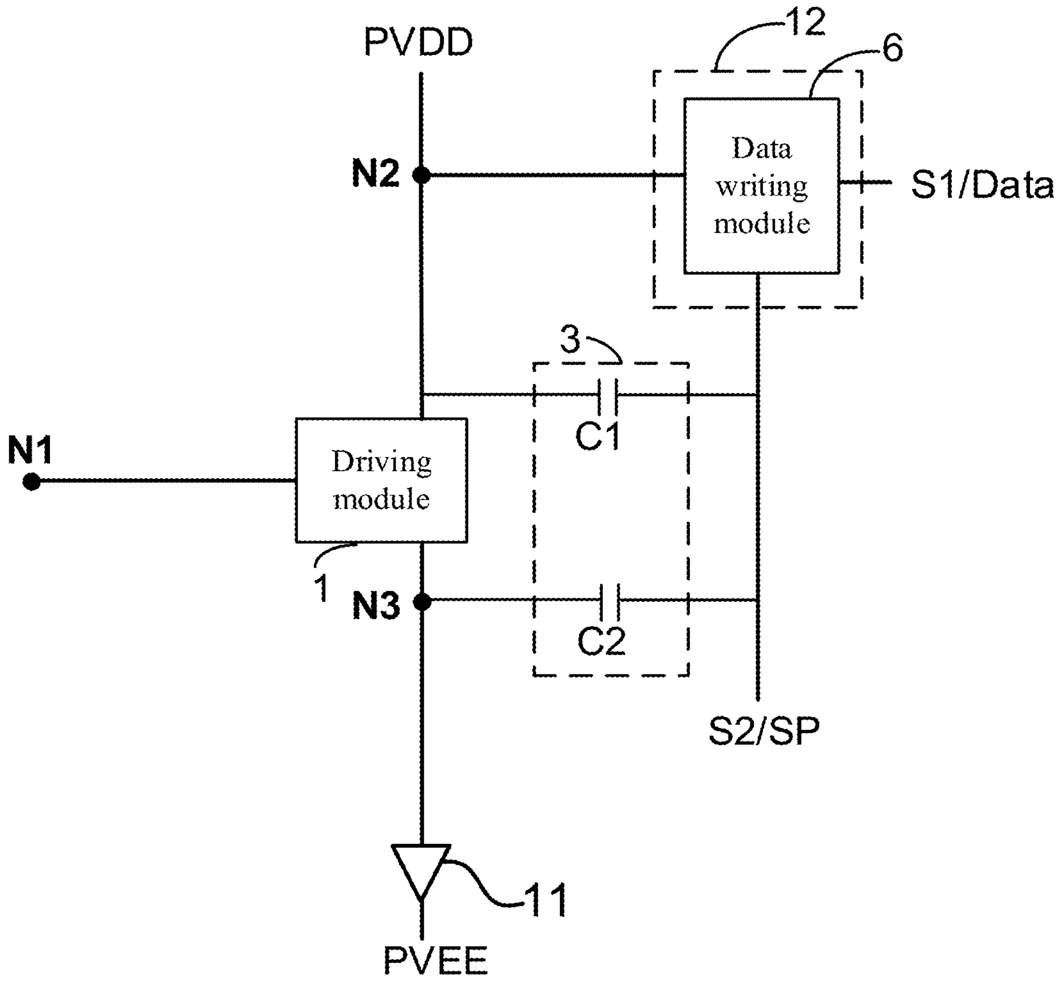
FIG. 6 illustrates another exemplary pixel driving circuit according to various disclosed embodiments of the present disclosure.

FIG. 4 is a schematic structural diagram of another exemplary pixel driving circuit according to various disclosed embodiments of the present disclosure. FIG. 5 is a schematic structural diagram of another exemplary pixel driving circuit according to various disclosed embodiments of the present disclosure. FIG. 6 is a schematic structural diagram of another exemplary pixel driving circuit according to various disclosed embodiments of the present disclosure. In some embodiments, as shown in FIGS. 4-6, the voltage writing module 12 may include a data writing module 6; the preset potential signal line S1 may include a data signal line Data; the first control signal line S2 may include a first scanning signal line SP; the potential coupling module 3 may include a first capacitor C1 and/or a second capacitor C2; the first capacitor C1 may be electrically connected between the first scanning signal line SP and the second node N2; and the second capacitor C2 may be electrically connected between the first scanning signal line SP and third node N3.

In one embodiment, the voltage writing module 12 may include, for example, the data writing module 6; and the preset potential signal line S1 may include, for example, the data signal line Data. The data writing module 6 may be configured to provide the driving module 6 in the data writing phase of the refresh frame and provide a preset potential signal to the driving module 1 during the holding frame stage to adjust the bias of the driving module 1.

FIG. 4 exemplarily shows that the potential coupling module 3 may include a first capacitor C1. The first terminal of the first capacitor C1 may be connected to the first scanning signal, and the second terminal of the first capacitor C1 may be connected to the second node N2. Taking the holding frame stage as an example, when the first scanning signal is a low-level signal, the data writing module 6 may be turned on. The preset potential signal transmitted on the data signal line Data may be written into the first terminal of the driving module 1 for adjusting the bias condition of the driving module 1. After that, the first scan signal may be pulled up to a high-level signal, the data writing module 6 may be turned off, and the first capacitor C1 may be connected to the high-level first scan signal, thereby pulling up the potential of the second node N2 by ΔV. At this time, the bias voltage VOBS=Vpark+ΔV, that is, the bias voltage is the sum of the voltage Vpark of the preset potential signal and the pulled-up voltage ΔV, thereby adjusting the voltage between the control terminal and the first terminal of the driving module 1 as Vgs=DATA+Vth−(Vpark+ΔV), the potential pulled-up by the second node N2 may be used to eliminate the difference in bias caused by different light-emitting elements 11 being connected to the same preset potential signal, thereby reducing the flicker effect.

FIG. 5 exemplarily shows that the potential coupling module 3 may include a second capacitor C2. The first terminal of the second capacitor C2 may be connected to the first scan signal, and the second terminal of the second capacitor C2 may be connected to the third node N3. Taking the holding frame stage as an example, when the first scan signal is a low-level signal, and the data writing module 6 may be turned on. The preset potential signal transmitted on the data signal line Data may be written into the first terminal of the driving module 1 for adjusting the bias condition of the driving module 1. After that, the first scan signal may be pulled up to a high-level signal, the data writing module 6 may be turned off, and the second capacitor C2 may be connected to the high-level first scan signal, thereby pulling up the potential of the third node N3 by ΔV. At this time, the bias voltage VOBS=Vpark+A V, that is, the bias voltage may be the sum of the voltage Vpark of the preset potential signal and the pulled-up voltage ΔV, thereby adjusting the voltage between the control terminal and the first terminal of the drive module 1 as Vgs=DATA+Vth−(Vpark+ΔV). The third node N3 may be used to eliminate the difference in bias caused by different light-emitting elements 11 being connected to the same preset potential signal Vpark, thereby reducing the screen flicker.

FIG. 6 exemplarily shows that the potential coupling module 3 may include a first capacitor C1 and a second capacitor C2. The first capacitor C1 may play a role in pulling down the potential of the second node N2, and the second capacitor C2 may play a role in pulling down the potential of the second node N2. The specific implementation method of the role of the third nodes N3 may refer to the above embodiment, and will not be described in detail here.

Figure 7:
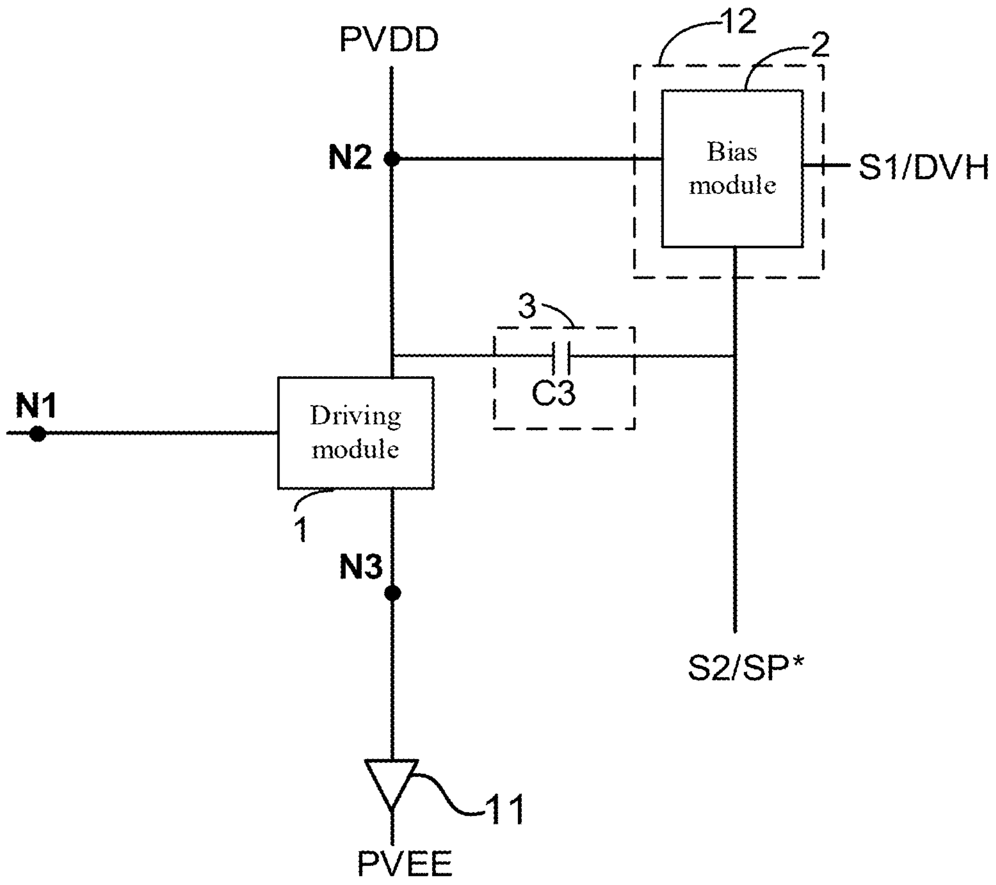
FIG. 7 illustrates another exemplary pixel driving circuit according to various disclosed embodiments of the present disclosure.

FIG. 7 is a schematic structural diagram of another exemplary pixel driving circuit according to various disclosed embodiments of the present disclosure. In some embodiments, as shown in FIG. 7, the voltage writing module 12 may include the bias module 2; the preset potential signal line S1 may include the bias signal line DVH; the first control signal line S2 may include the bias control signal line SP*; the potential coupling module 3 may include a third capacitor C3; and the third capacitor C3 may be connected between the bias control signal line SP* and the second node N2.

Specifically, as shown in FIG. 7, the voltage writing module 12 may include, for example, a bias module 2. In the case of long-term use of the pixel driving circuit, the driving module 1 may be used to provide the driving current for the light-emitting element 11. The driving module 1 may determine the value of the driving current according to its gate potential, thereby controlling the gate voltage of the driving module 1 to adjust the light-emitting brightness of the light-emitting element 11. Because the driving module 1 may be controlled by a voltage for a long time, it may be affected by the bias voltage, causing the driving module 1 to be voltage biased, which may affect the effect of controlling the light-emitting element 11. Therefore, the pixel driving circuit may also include a bias module 2. The bias module 2 may pull up the source/drain potential of the driving module 1 and improve the bias condition of the driving module 1. The preset potential signal line S1 may include, for example, a bias signal line DVH. The bias module 2 may be used to provide a preset potential signal, that is, a bias signal, to the drive module 1 in each biasing stage to bias the driving module 1.

FIG. 7 exemplarily shows that the potential coupling module 3 may include a third capacitor C3. The first terminal of the third capacitor C3 may be electrically connected to the bias control signal line. The second terminal of the third capacitor C3 may be electrically connected to the second node N2. Taking the holding frame stage as an example, when the bias control signal is a low-level signal and the bias module 2 may be turned on, the bias signal transmitted on the bias signal line DVH may be written into the first terminal of the driving module 1 to adjust the bias condition of the driving module. 1. After that, the bias control signal may be pulled up to a high-level signal, the data writing module 6 may be turned off, and the third capacitor C3 may be connected to the high-level bias control signal, thereby pulling up the potential of the third node N3 by ΔV. At this time, the bias voltage VOBS=VPARK+ΔV, that is, the bias voltage may be the sum of the voltage VPARK of the preset potential signal and the pulled-up voltage ΔV, thereby adjusting the voltage between the control terminal and the first terminal of the drive module 1 as Vgs=DATA+Vth−(Vpark+ΔV). The potential pulled-up by the third node N3 may be used to eliminate the difference in bias effect caused by different light-emitting elements 11 being connected to the same bias signal, thereby reducing the screen flicker.

It can be understood that a fourth capacitor (not specifically shown in the drawing) may also be provided between the third node N3 and the bias control signal line SP*, and the fourth capacitor may be used to pull up the potential of the third node N3. Specific implementation methods may refer to the above-mentioned embodiments, and will not be described in detail here.

The pixel driving circuit provided by the embodiments of the present disclosure may utilize the potential coupling module 3 to pull up the voltage of the first terminal and/or the second terminal of the driving module 1, and the pulled-up potential of the second node N2 and/or the third node N3 may be used to eliminate the differences in bias caused by different light-emitting elements 11 being connected to the same preset potential signal, thereby eliminating the risk of the flicker deterioration such that light-emitting elements 11 of different colors may be subject to the same degree of bias, optimizing the flickering performance of the display panel and the display effect of the display panel may be improved.

Figure 8:
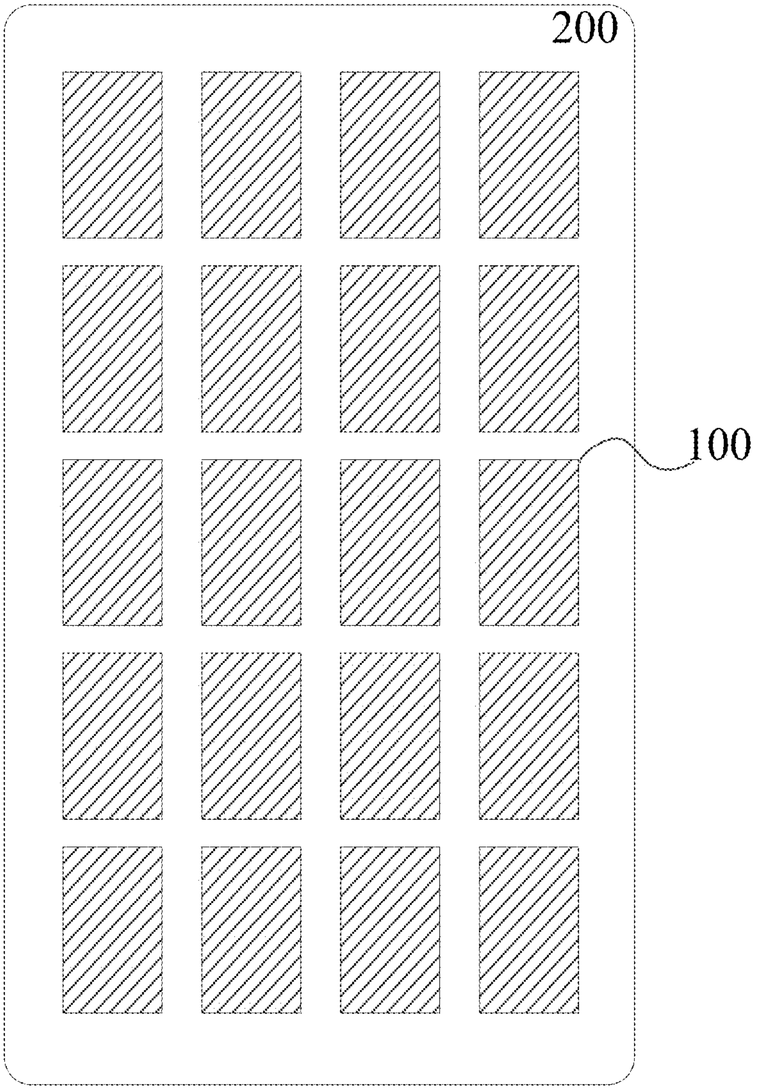
FIG. 8 illustrates an exemplary display panel according to various disclosed embodiments of the present disclosure.

The present disclosure also provides a display panel. FIG. 8 is a schematic structural diagram of an exemplary display panel according to various disclosed embodiments of the present disclosure. As shown in FIG. 8, the display panel 200 may include a light-emitting element (not shown); and a plurality of pixel driving circuits 100 electrically connected to the light-emitting element. At least a partial number of the pixel driving circuits 100 may be the pixel driving circuits 100 described in any of the above embodiments.

For example, the display panel 200 may include a plurality of light-emitting elements and a plurality of pixel driving circuits 100 arranged in an array. The pixel driving circuits 100 may be arranged in an array along the row direction and the column direction in the display panel 200. The light-emitting elements may be, for example, OLEDs or Micro LEDs, etc., that may emit light independently and are not specifically shown in FIG. 8. The pixel driving circuit 100 may correspondingly drive different light-emitting element to perform a light-emitting display according to the target light-emitting brightness such that the display panel 200 may display the target screen. For example, the pixel driving circuits 100 may at least partially adopt the pixel driving circuits 100 used in the above embodiments such that they may solve the same technical problems as the above embodiments of the pixel driving circuits 100 and achieve the same technical effects, which will not be described again here. For example, the pixel driving circuits 100 may also adopt the pixel driving circuits 100 described in the above embodiments to simplify the manufacturing process of the display panel 200 and optimize the display effect.

In some embodiments, the light-emitting element may include a light-emitting element of a first color and a light-emitting element of second color. The first color may be different from the second color. The pixel driving circuit may include a first pixel driving circuit and a second pixel driving circuit. The first pixel driving circuit may be electrically connected to the light-emitting element of the first color, and the second pixel driving circuit may be electrically connected to the light-emitting element of the second color. At least a partial number of the pixel driving circuits may at least include the first pixel driving circuits.

Specifically, the first pixel driving circuit may be configured to drive the light-emitting element of the first color to perform light-emitting display according to the target light-emitting brightness, and the second pixel driving circuit may be configured to drive the light-emitting element of the second color to perform the light-emitting display according to the target light-emitting brightness. The light-emitting element of the first color and the light-emitting element of the second color may be light-emitting elements with different emitting colors. Therefore, the light-emitting element of the first color and the light-emitting element of the second color may have different light-emitting efficiencies and the voltages of the data signals may also be different. Therefore, the first pixel driving circuit and the second pixel driving circuit may be differentially designed to match the lighting requirements of different light-emitting elements.

In one embodiment, the light-emitting element of the first color may be a green light-emitting element, and the light-emitting element of the second color may be a blue light-emitting element. At least a partial number of the pixel driving circuits described in the above embodiments may include at least a first pixel electrically connected to the green light-emitting element but may not include a second pixel driving circuit electrically connected to the blue light-emitting element. It may also be possible to configure at least a partial number of the pixel driving circuits described in the above embodiments to include at least a first pixel driving circuit electrically connected to the green light-emitting element and a second pixel driving circuit electrically connected to the blue light-emitting element.

In another embodiment, the light-emitting element of the first color may be a green light-emitting element, and the light-emitting element of the second color may be, for example, a red light-emitting element. It may be configured that at least a partial number of the pixel driving circuits described in the above embodiments include at least a first pixel driving circuit electrically connected to the green light-emitting element, but does not include a second pixel driving circuit electrically connected to the red light-emitting element. It may also be configured that at least a partial number of the pixel driving circuits described in the above embodiments include at least a first pixel driving circuit electrically connected to the green light-emitting element and a second pixel driving circuit electrically connected to the red light-emitting element.

In another embodiment, the light-emitting element of the first color may be, for example, a red light-emitting element, and the light-emitting element of the second color may be, for example, a blue light-emitting element. At least a partial number of pixel driving circuits described in the above embodiments may include at least a first pixel electrically connected to the red light-emitting element, but may not include a second pixel driving circuit electrically connected to the blue light-emitting element. It may also be configured that at least a partial number of the pixel driving circuits described in the above embodiment includes at least a first pixel driving circuit electrically connected to the red light-emitting element and a second pixel driving circuit electrically connected to the blue light-emitting element.

Therefore, it may be ensured that at least a partial number of the first pixel driving circuits electrically connected to the light-emitting element of the first color may include a potential coupling module such that the potential of at least one of the second node and the third node in the first pixel driving circuit may be pulled up; the potential pulled-up on the second node and/or the third node may eliminate the difference in bias caused by different light-emitting elements being connected to the same preset potential signal, thereby eliminating the risk of flicker deterioration, thereby making the light-emitting elements of the different colors may be subject to the same degree of bias, which may optimize the flickering performance of the display panel and also improve the display effect of the display panel.

Figure 9:
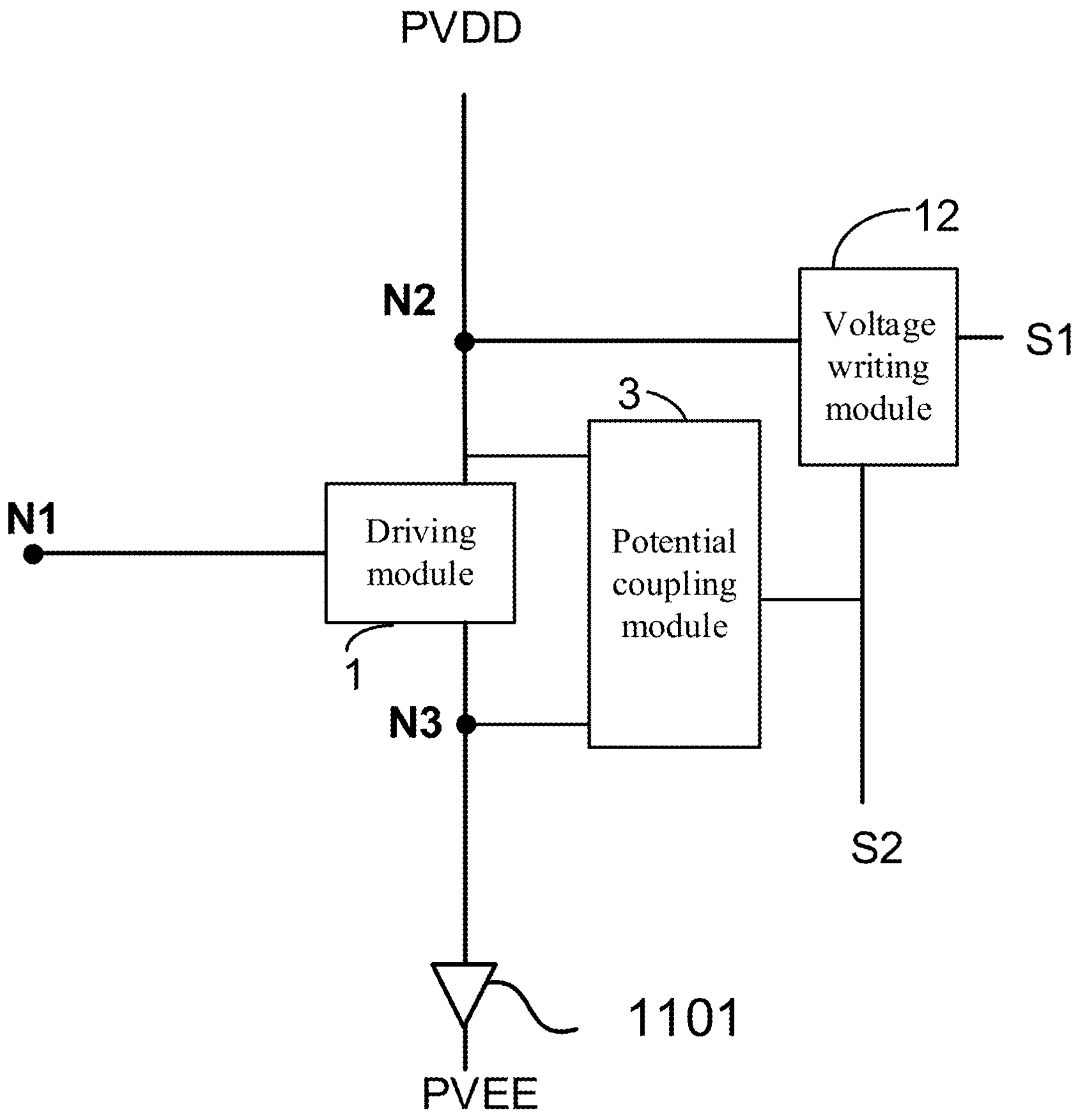
FIG. 9 illustrates an exemplary first pixel driving circuit according to various disclosed embodiments of the present disclosure.
Figure 10:
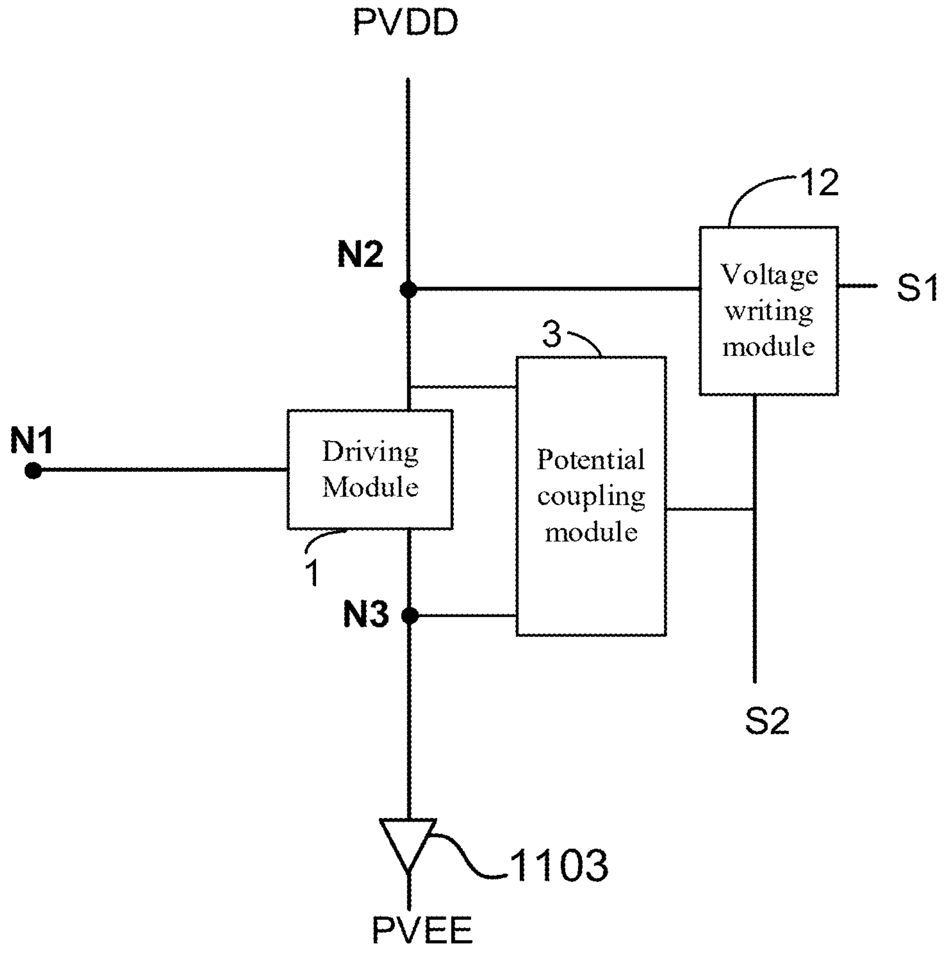
FIG. 10 illustrates an exemplary third pixel driving circuit according to various disclosed embodiments of the present disclosure.

FIG. 9 is a schematic structural diagram of an exemplary first pixel driving circuit according to various embodiments of the present disclosure, and FIG. 10 is a schematic structural diagram of an exemplary third pixel driving circuit according to various disclosed embodiments of the present disclosure. As shown in FIGS. 9-10, in some embodiments, the light-emitting element 11 may also include a light-emitting element 1103 of a third color. The third color may be different from the first color and the second color. The pixel driving circuit may also include a third pixel driving circuit. The third pixel driving circuit may be electrically connected to the light-emitting element 1103 of the third color. At least a partial number of the pixel driving circuits may also include a third pixel driving circuit. The potential coupling module 3 of the first pixel driving circuit may have a first coupling value, the potential coupling module 3 of the third pixel driving circuit may have a second coupling value, and the second coupling value may be different from the first coupling value.

Specifically, referring to FIGS. 9-10, the third pixel driving circuit may be configured to drive the light-emitting element 1103 of the third color to perform a light-emitting display according to the target light-emitting brightness. The light-emitting element 1101 of the first color, the light-emitting element of the second color and the light-emitting element 1103 of the third color may be light-emitting elements 11 with different emitting colors. Therefore, the light-emitting efficiency of the light-emitting element 1101 of the first color, the light-emitting element of the second color and the light-emitting element 1103 of the third color may all be different; and the voltages of the input data signals written by the driving module 1 in the data writing stage of the refresh frame may also be different. Thus, the first pixel driving circuit, the second pixel driving circuit and the third pixel driving circuit may be differentially designed to match the light-emitting requirements of different light-emitting elements 11 and eliminate the bias differences of light-emitting elements 11 of different colors in the frame holding stages to reduce the screen flickering.

In one embodiment, the voltage of the data signal of the light-emitting element of the second color, for example, may be the lowest, it may be seen from the voltage between the control terminal and the first terminal of the driving module 1: Vgs=DATA+Vth−Vpark that the driving module in the second pixel driving circuit 1 may have the smallest Vgs. When the preset potential signals of light-emitting elements of different colors are the same, the biasing effect of the light-emitting element of the second color may be the strongest. Therefore, the second pixel driving circuit of the light-emitting element of second color may not need to have the potential coupling module. The voltages of the data signals of the light-emitting element 1101 of the first color and the light-emitting element 1103 of the third color may be different, thus the potential pulled up by the potential coupling module 3 of the first pixel driving circuit and the potential pulled up by the potential coupling module 3 of the third pixel driving circuit 3 may be different. Thus, by setting the first coupling value of the potential coupling module 3 of the first pixel driving circuit to be different from the second coupling value of the potential coupling module 3 in the third pixel driving circuit to eliminate the difference in bias effects among the light-emitting elements 11 of different colors, the bias effect of the red light-emitting element 11, the green light-emitting element 11 and the blue light-emitting element 11 may be same. FIG. 9 exemplarily shows that the potential coupling module 3 of the first pixel driving circuit may be electrically connected to the second node N2 and the third node N3. FIG. 10 exemplarily shows the potential coupling module of the third pixel driving circuit 3 may be electrically connected to the second node N2 and the third node N3.

Figure 11:
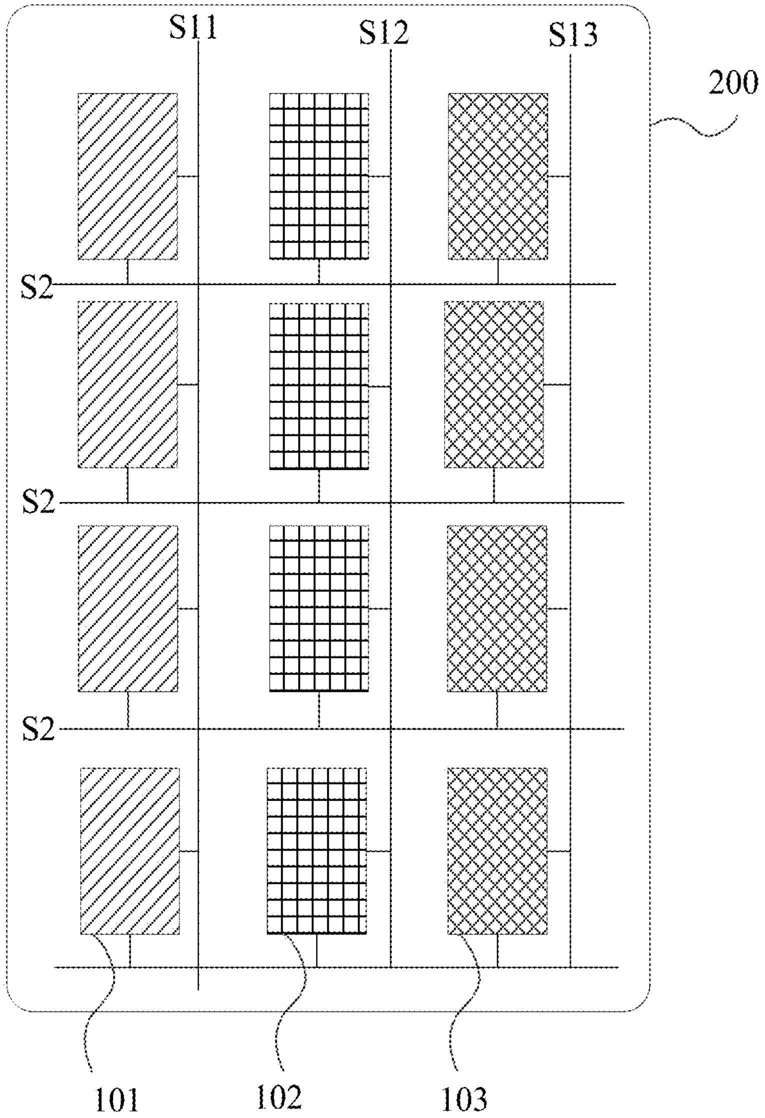
FIG. 11 illustrates another exemplary display panel according to various disclosed embodiments of the present disclosure.

FIG. 11 is a schematic structural diagram of another exemplary display panel according to various disclosed embodiments of the present disclosure. In some embodiments, as shown in FIG. 11, the preset potential signal line S1 may include a first potential signal line S11, a second potential signal line S12 and a third potential signal line S13. The first potential signal line S11 may be connected to the first pixel driving circuit 101; the second potential signal line S12 may be connected to the second pixel driving circuit 102; and the third potential signal line S13 may be connected to the third pixel driving circuit 103. The driving time sequence of the pixel driving circuit may include a refresh frame, and in the refresh frame, the first potential signal line S11 may transmit a first potential signal, the second potential signal line S12 may transmit a second potential signal, and the third potential signal line S13 may transmit a third potential signal. The second potential signal may be lower than the first potential signal and the third potential signal. FIG. 11 only exemplarily shows portions of the first pixel driving circuit 101, the second pixel driving circuit 102 and the third pixel driving circuit 103, and the first pixel driving circuit 101, the second pixel driving circuit 102 and the third driving circuit 103 are distinguished with different filling patterns. The first control signal line S2 may be electrically connected to the first pixel driving circuit 101, the second pixel driving circuit 102 and the third pixel driving circuit 103.

Specifically, for the first pixel driving circuit 101, during the data writing stage of the refresh frame, the first control signal of the first control signal line S2 may control the potential writing module to be turned on, and the first potential signal of the first potential signal line S11 may be transmitted to the control terminal of the driving module, e.g., written to the first node N1. For the third pixel driving circuit 102, during the data writing stage of the refresh frame, the first control signal of the first control signal line S2 may control the potential writing module to be turned on, and the second potential signal of the second potential signal line S12 may be transmitted to the control terminal of the driving module, e.g., written to the first node N1. For the third pixel driving circuit 103, during the data writing stage of the refresh frame, the first control signal line S 2 may control the potential writing module to be turned on, and the third potential signal of the third potential signal line S13 may be transmitted to the control terminal of the driving module, e.g., written to the first node N1.

Because the driving module may provide the driving current to the light-emitting element, the driving module may determine the value of the driving current according to the potential of its control terminal, the light-emitting brightness of the light-emitting element may be adjusted by adjusting the voltage of the control terminal of the driving module. Accordingly, the voltage of the first potential signal may determine the brightness of the first color light-emitting element; the voltage of the second potential signal may determine the brightness of the second color light-emitting element, and the voltage of the third voltage signal may determine the brightness of the third color light-emitting element. The light-emitting efficiency of the second color light-emitting element may be the lowest, thus the second potential signal may be lower than the first potential signal and the third potential signal.

Figure 12:
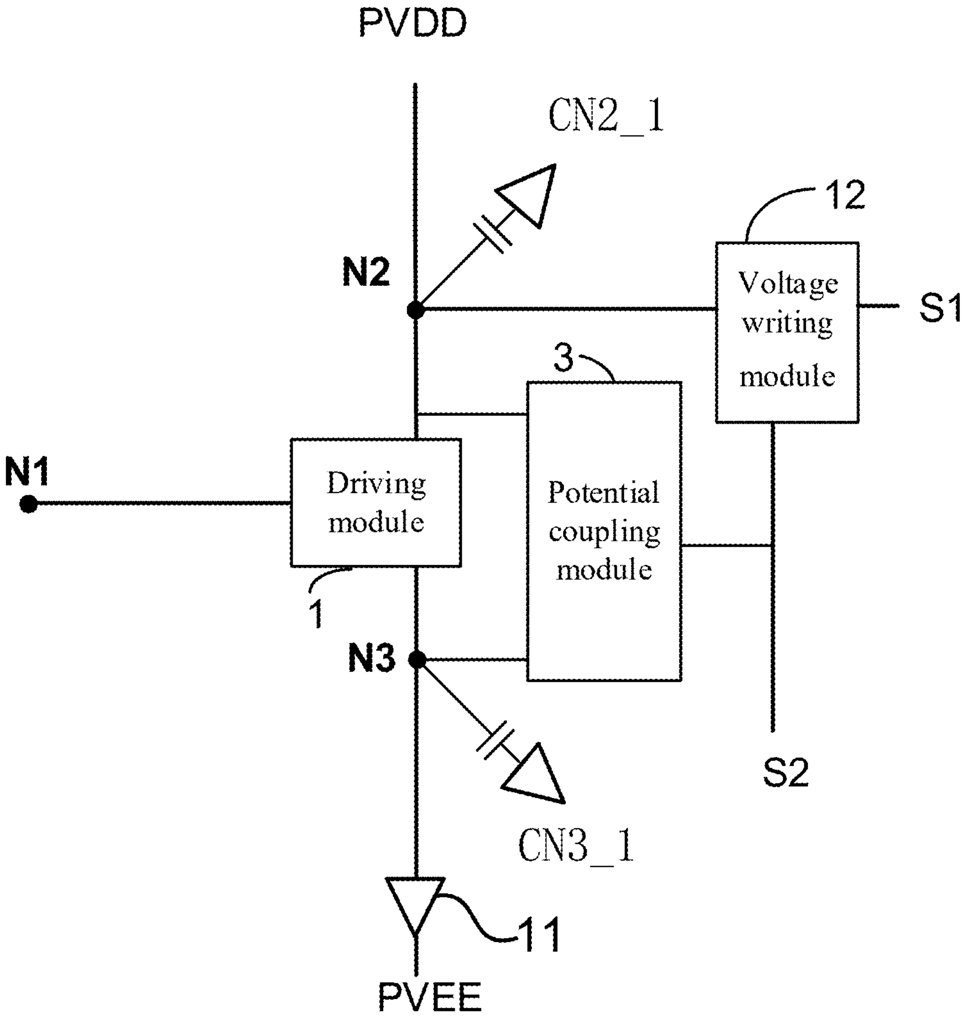
FIG. 12 illustrates another exemplary pixel driving circuit according to various disclosed embodiments of the present disclosure.

FIG. 12 is a schematic structural diagram of another exemplary pixel driving circuit according to various disclosed embodiments of the present disclosure. In some embodiments, as shown in FIG. 12, the first coupling value may be determined based on the second potential signal, the first potential signal, the potential change amount on the first control signal line S2, and the parasitic capacitance of the target node; and the second coupling value may be determined based on the second potential signal, the third potential signal, the potential change amount on the first control signal line S2 and the parasitic capacitance of the target node. The target node may be the node to which the potential coupling module 3 is connected. FIG. 10 exemplarily shows the parasitic capacitance CN2_1 of the second node and the parasitic capacitance C_N3 of the third node.

For example, different first pixel driving circuits may have different requirements for the low potential of the second node N2 and/or the third node N3. Therefore, the first coupling value may be adjusted to make the first coupling value satisfy the needs of the display panel. To make the bias effect of the light-emitting elements 11 of different colors the same, the second color light-emitting element may be used as a reference such that the voltage between the control terminal and the first terminal of the driving module 1 of the second color light-emitting element may be same as the voltage between the control terminal and the first terminal of the driving module 1 of the first color light-emitting element 1101. Thus, the first coupling value may be related to the second potential signal and the first potential signal. Further, during the holding frames stage, the first control signal transmitted by the first control signal line S2 may be changed from a low level to a high level, and the potential change amount on the first control signal line S2 may also affect the first coupling value. Further, due to the vertical block between the signal line and the target node, the Cgs and Cgd capacitance of the transistor itself in the pixel driving circuit and the lateral capacitance generated by the spatial electric field, etc., may generate the parasitic capacitance, and the parasitic capacitance may be unavoidable. Thus, the parasitic capacitance of the target node may also affect the first coupling value. To sum up, the first coupling value may be determined based on the second potential signal, the first potential signal, the potential change amount on the first control signal line S2 and the parasitic capacitance of the target node.

For example, different third pixel driving circuits may have different requirements for the low potential of the second node N2 and/or the third node N3, thus the second coupling value may be adjusted to make the second coupling value satisfy the needs of the display panel. To make the bias effect of light-emitting elements 11 of different colors the same, the second color light-emitting element may be used as a reference such that the voltage Vgs between the control terminal and the first terminal of the driving module 1 of the second color light-emitting element may be equal to the voltage Vgs between the control terminal and the first terminal of the driving module 1 of the third color light-emitting element 1103. Accordingly, the second coupling amount may be related to the second potential signal and the third potential signal. Further, during the holding frame stage, the first control signal transmitted by the first control signal line S2 may change from a low level to a high level, and the potential change amount on the first control signal line S2 may also affect the second coupling amount. In addition, due to the vertical block between the signal line and the target node, the Cgs and Cgd capacitance of the transistor itself in the pixel driving circuit and the lateral capacitance generated by the spatial electric field, etc., may generate a parasitic capacitance, and the parasitic capacitance may be unavoidable. Thus, the parasitic capacitance of the target node may also affect the second coupling value. To sum up, the second coupling value may be determined based on the second potential signal, the third potential signal, the potential change amount on the first control signal line S2 and the parasitic capacitance of the target node.

In some embodiments, the first coupling value may be C1 and may satisfy:

$$C1 = \frac{(\text{Data1} - \text{Data2}) * \text{CNX\_1}}{Vgh - Vg1}$$

Data2 may represent the second potential signal, Data1 may represent the first potential signal, Vgh−Vgl may represent the potential change amount on the first control signal line, and CNX_1 may represent the parasitic capacitance of the target node in the first pixel driving circuit.

For example, to eliminate the difference in the bias effect of light-emitting elements of different colors during the frame holding stage, the voltage between the control terminal and the first terminal of the first pixel driving circuit should be equal to the voltage between the control terminal and the first terminal of the second pixel driving circuit. Then, the potential change of the target node may be equal to the difference between the first potential signal and the second potential signal. According to the principle of the pixel driving circuit, the difference between the first potential signal and the second potential signal Data1−Data2=(Vgh−Vgl)×C1/CNX_1. Thus, the first coupling value C1=(Data1−Data2)×CNX_1/(Vgh−Vgl).

In some embodiments, the first coupling value may be C1 and may satisfy:

$$0 < C2 < \frac{(\text{Data3} - \text{Data2}) * \text{CN2\_3}}{(Vgh - Vgl)} + \frac{(\text{Data3} - \text{Data2}) \times \text{CN3\_3}}{(Vgh - Vgl)}$$

Data2 may represent the second potential signal, Data1 may represent the first potential signal, Vgh−Vgl may represent the potential change amount on the first control signal line, CN2_1 may represent the parasitic capacitance of the second node in the first pixel driving circuit, and CN3_1 may represent the parasitic capacitance of the third node in the first pixel driving circuit.

Specifically, considering the influence of the parasitic capacitance of the second node and the influence of the parasitic capacitance of the third node in the pixel driving circuit, a value range may be set for the first coupling value. For example, the difference between the first potential signal and the second potential signal may be, for example, 0.4V; the parasitic capacitance of the second node in the first pixel driving circuit and the parasitic capacitance of the third node in the first pixel driving circuit may be both, for example, 10fF; the potential change amount Vgh−Vgl on the first control signal line may be 15V; and the range of the first coupling value may be 0<C1<0.53fF.

In some embodiments, the second coupling value may be C2 and may satisfy:

$$C2 = \frac{(\text{Data3} - \text{Data2}) \times \text{CNX\_3}}{(Vgh - Vgl)}$$

Data2 may represent the second potential signal; Data3 may represent the third potential signal; Vgh−Vgl may represent the potential change amount on the first control signal line; and CNX_3 may represent the parasitic capacitance of the target node in the third pixel driving circuit.

For example, to eliminate the difference in the bias effect of light-emitting elements of different colors during the frame holding stage, the voltage between the control terminal and the first terminal of the third pixel driving circuit should be equal to the voltage between the control terminal and the first terminal of the second pixel driving circuit. Then the potential change of the target node may be equal to the difference between the third potential signal and the second potential signal. According to the principle of the pixel driving circuit, it may be seen that the difference between the third potential signal and the second potential signal Data3−Data2−(Vgh−Vgl)×C1/CNX_3, thus the second coupling amount C2=(Data3−Data2)×CNX_3/(Vgh−Vgl).

In some embodiments, the second coupling value may be C2 and may satisfy:

$$0 < C2 < \frac{(\text{Data3} - \text{Data2}) \times \text{CN2\_3}}{(Vgh - Vgl)} + \frac{(\text{Data3} - \text{Data2}) \times \text{CN3\_3}}{(Vgh - Vgl)}$$

Data2 may represent the second potential signal; Data3 may represent the third potential signal; Vgh−Vgl may represent the potential change amount on the first control signal line; CN2_3 may represent the parasitic capacitance of the second node in the third pixel driving circuit; and CN3_3 may represent the parasitic capacitance of the third node in the third pixel driving circuit.

Specifically, considering the influence of the parasitic capacitance of the second node and the influence of the parasitic capacitance of the third node in the pixel driving circuit, a value range may be set for the third coupling value. For example, the difference between the first potential signal and the second potential signal may be, for example, 0.4V; the parasitic capacitance of the second node in the third pixel driving circuit and the parasitic capacitance of the third node in the third pixel driving circuit may be both, for example, 10fF; the potential change amount Vgh−Vgl on the first control signal line may be 15V, and the range of the second coupling value may be 0<C1<0.53fF.

In some embodiments, the first color may be red, the second color may be blue, and the third color may be green.

For example, the first color light-emitting element may be a red light-emitting element, the second color light-emitting element may be a blue light-emitting element, and the third color light-emitting element may be a green light-emitting element. The blue light-emitting element may have the lowest light-emitting efficiency; and the voltage of the data signal may also be the lowest. In the holding frame stage, the voltage between the control terminal and the first terminal of the driving module of the blue light-emitting element Vgs_B=DATA_B+Vth−Vpark may also be the lowest. When the red light-emitting element, the green light-emitting element and the blue the light-emitting elements all use the same preset potential signal Vpark, the bias effect of the blue light-emitting element may be the strongest. Therefore, the second pixel driving circuit may be set not to include the potential coupling module, and the first pixel driving circuit and the third pixel driving circuit may both include the potential coupling module. In some embodiments, the potential coupling module in the first pixel driving circuit may be used to pull up the potential of at least one of the second node and the third node by ΔV1, and the voltage between the control terminal and the first terminal of the driving module of the red light-emitting element Vgs_R=DATA_R+Vth−(Vpark+ΔV1) may make Vgs_R=Vgs_B. In other embodiments, the potential coupling module in the third pixel driving circuit may be used to pull up the potential of at least one of the second node and the third node by ΔV2, and the voltage between the control terminal and the first terminal of the driving module of the green light-emitting element Vgs_G=DATA_G+Vth−(Vpark+ΔV2) may make Vgs_G=Vgs_B.

Figure 13:
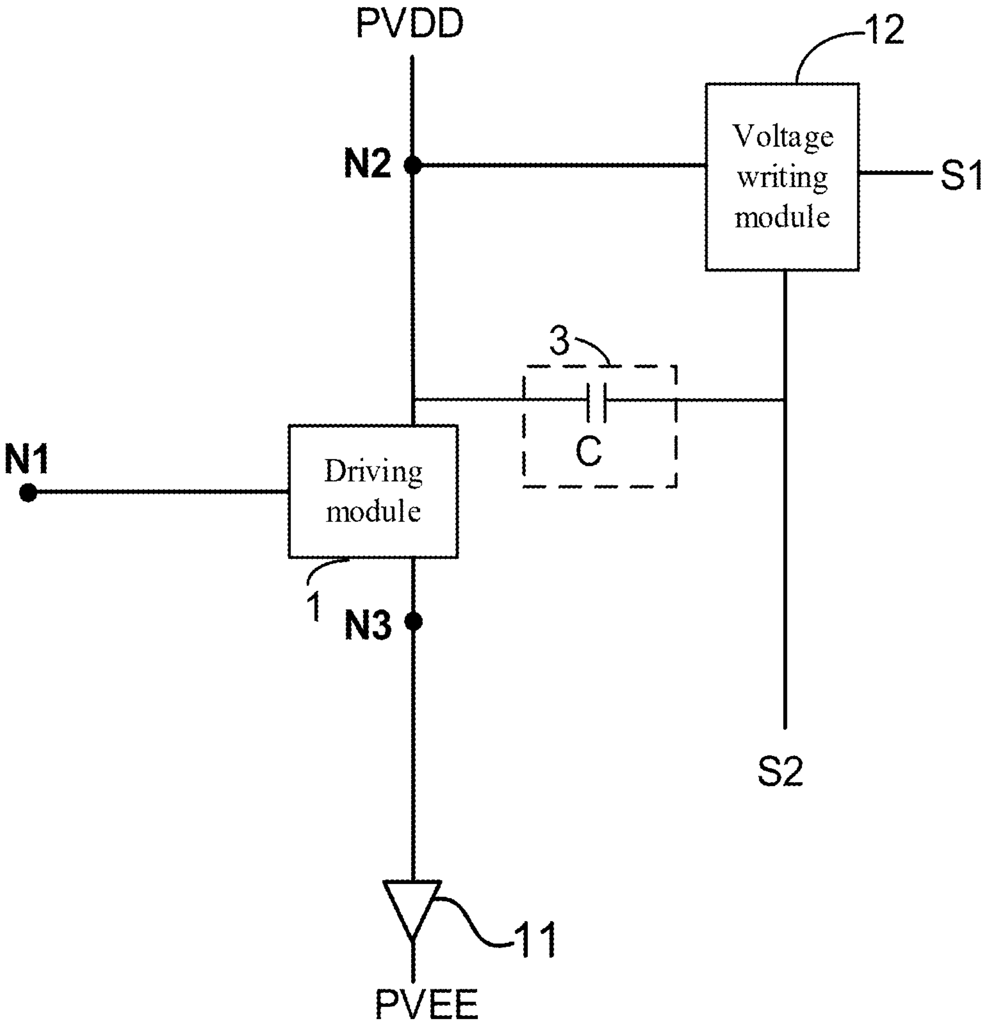
FIG. 13 illustrates another exemplary pixel driving circuit according to various disclosed embodiments of the present disclosure.
Figure 14:
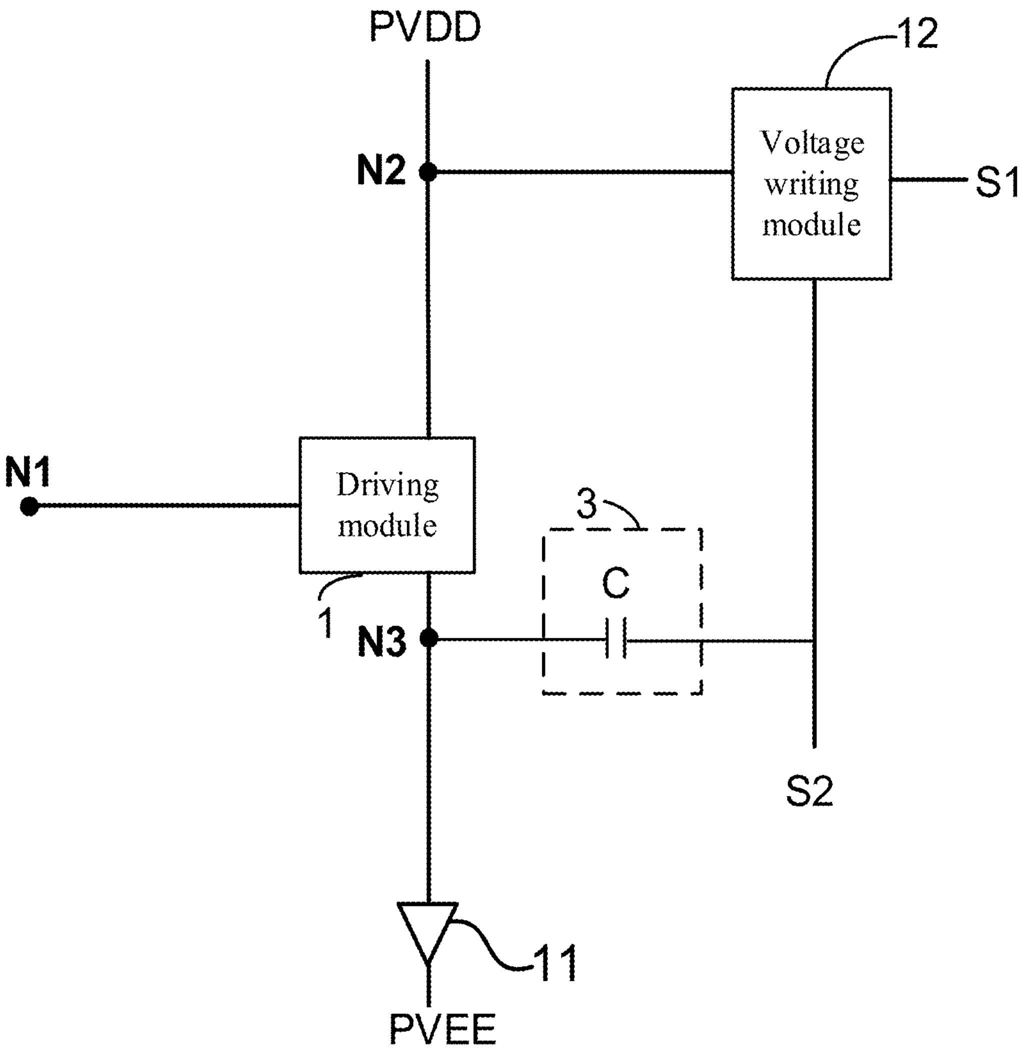
FIG. 14 illustrates another exemplary pixel driving circuit according to various disclosed embodiments of the present disclosure.

FIG. 13 is a schematic structural diagram of another exemplary pixel driving circuit according to various disclosed embodiments of the present disclosure. FIG. 14 is a schematic structural diagram of another exemplary pixel driving circuit according to various disclosed embodiments of the present disclosure. In some embodiments, as shown in FIGS. 13-14, the potential coupling module 3 may include a coupling capacitor C.

FIG. 13 exemplarily shows that, when the first terminal of the coupling capacitor C is electrically connected to the first control signal line S2, and the second terminal of the coupling capacitor C may be electrically connected to the second node N2. During the holding frame stage, the first control signal may be a low-level signal, the voltage writing module 12 may be turned on, and the preset potential signal may be written into the first terminal of the driving module 1. To eliminate the difference in the bias effect of the light-emitting elements 11 of different colors in the holding frame stage, the first control signal may be pulled up to a high-level signal, the voltage writing module 12 may be turned off, and the coupling capacitor C may be connected to the high-level signal to pull up the potential of the second node N2. The pulled-up potential of the second node N2 may eliminate the difference in bias caused by connecting the light-emitting elements 11 to the same preset potential signal Vpark. Accordingly, the risk of flicker deterioration may be eliminated such that the light-emitting elements 11 of different colors may be subject to the same degree of bias.

FIG. 14 exemplarily shows that when the first terminal of the coupling capacitor C may be electrically connected to the first control signal line S2 and the second terminal of the coupling capacitor C may be electrically connected to the third node N3. During the holding frame stage, when the first control signal is a low-level signal, the voltage writing module 12 may be turned on, and the preset potential signal Vpark may be written into the driving module 1. To eliminate the difference in the bias effect of the light-emitting elements 11 of different colors in the holding frame stage, the first control signal may be pulled up to a high-level signal, the voltage writing module 12 may be turned off, and the coupling capacitor C may be connected to the high-level signal to raise the potential of the third node N3. The pulled-up potential of the third node N3 may eliminate the difference in bias effect caused by connecting different light-emitting elements 11 to the same preset potential signal Vpark, thereby eliminating the risk of flicker deterioration such that the light-emitting elements 11 of different colors may be subjected to the same degree of bias effect.

Figure 15:
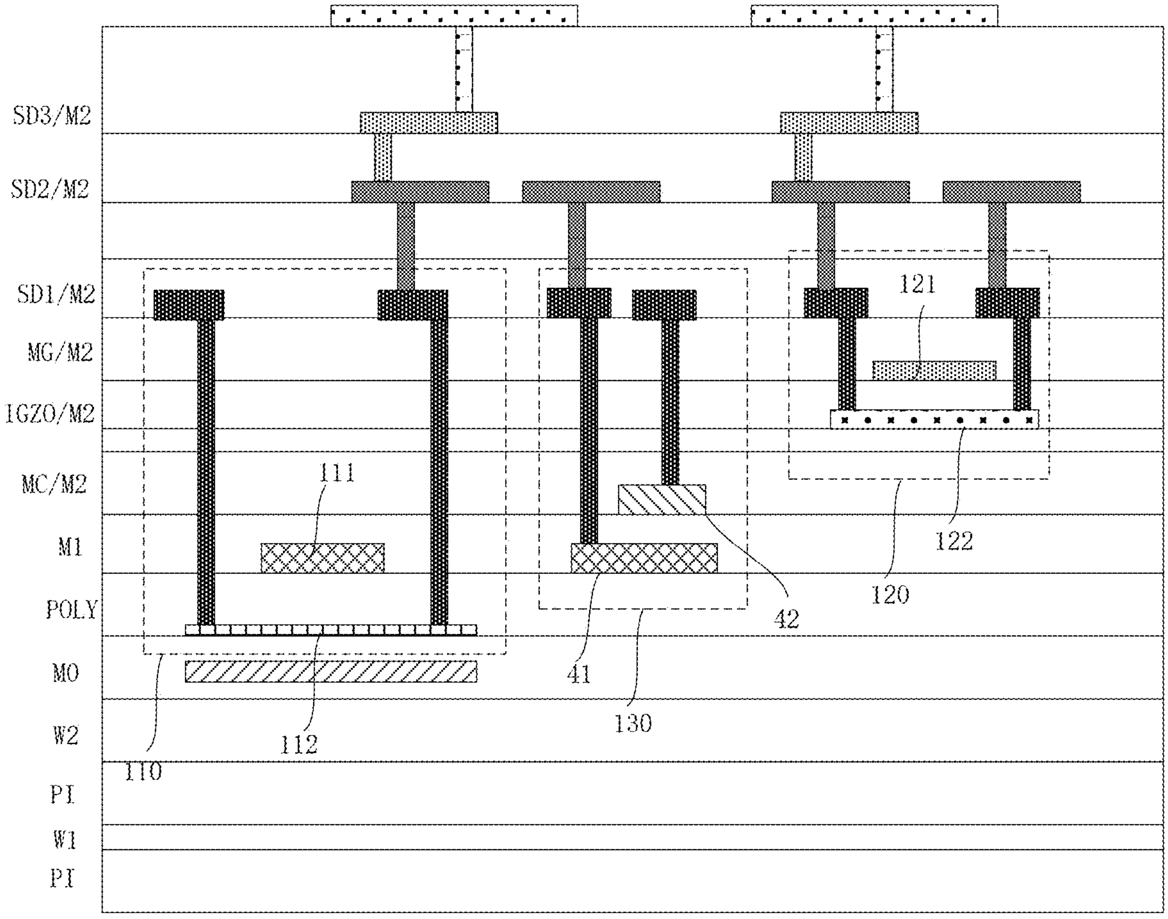
FIG. 15 illustrates a cross-sectional view of an exemplary display according to various disclosed embodiments of the present disclosure.

FIG. 15 is a schematic cross-sectional structural diagram of an exemplary display panel according to various disclosed embodiments of the present disclosure. In some embodiments, as shown in FIG. 15, the display panel may further include a base substrate PI. The pixel driving circuit may also include a first conductive layer M1 and a second conductive layer M2 located on one side of the base substrate PI. The second conductive layer M2 may be located on the side of the first conductive layer M1 away from the substrate PI. The transistors in the pixel driving circuit may include a first type of transistors 110 and a second type of transistors 120. The material of the active layer 112 of the first type of transistors 110 may be different from the material of the active layer 122 of the second type of transistors 10. The first conductive layer M1 may include one terminal 41 of the coupling capacitor C and the gate 111 of the first type of transistors 110. The second conductive layer M2 may include the other terminal 42 of the coupling capacitor C and one terminal of the potential holding module 4 of the pixel driving circuit, the gate 121 of the second type of transistors 120, the active layer 122 of the second type of transistors, or the source/drains of the first type of transistors and the second type of transistors.

Specifically, as shown in FIG. 15, the base substrate PI may be used to support film layers disposed thereon. The base substrate PI may include a rigid substrate, such as glass or a silicon wafer, or a flexible substrate, such as thin glass, stainless steel, or polyimide, etc., and is not limited here. A first shielding layer W1 and a second shielding layer W2 may be also provided on the base substrate PI to prevent the charge crosstalk from occurring.

The first conductive layer M1 and the second conductive layer M2 may be two conductive layers provided with both terminals of the coupling capacitor C. Specifically, because the coupling capacitor C may be electrically connected to the bias control signal line SP*, one terminal of the coupling capacitor C 41 may be provided in the same layer as the bias control signal line SP*, e.g., the first conductive layer M1, and the gate electrode 111 of the first type transistor may also be provided in the first conductive layer M1. One terminal 41 of the coupling capacitor C and the gate electrode 111 of the first type of transistors may be located on the same layer, e.g., the first conductive layer M1. Because the bias control signal line SP* may be electrically connected to the gate electrode of a bias transistor T8, the first type of transistors 110 may include, for example, the bias transistor T8.

Further, the other terminal 42 of the coupling capacitor C may be provided with other conductive layers, for example, the second conductive layer M2. The second conductive layer M2 may be, for example, the metal layer where one terminal of the potential holding module 4 is located, for example, the capacitor metal layer MC. FIG. 15 illustratively shows that the other terminal 42 of the coupling capacitor C may be located on the capacitive metal layer MC. The second conductive layer M2 may also be, for example, the gate electrode 121 of the second type of transistors. The gate electrode 121 of the second type of transistors may be located, for example, on the second sub-gate metal layer MG. The second conductor layer M2 may also be the gate electrode 121 of the second type of transistors, which may be equivalent to that the active layer 122 of the second type of transistors may be metallized for the wiring, and may be processed in other locations except the active area, such that a portion of the structure in the active layer may be a conductive structure. FIG. 15 exemplarily shows that the source/drains of the second type of transistors 120 may be arranged in multiple layers, namely a first source/drain layer SD1, a second source/drain layer SD2 and a third source/drain layer SD3. The other terminal 42 of the coupling capacitor of C may also be provided on these conductive layers as the second conductive layer M2.

FIG. 15 exemplarily shows a film layer stacked structure of a display panel using the LTPO technology. The active layer 112 of the first type of transistors and the active layer 122 of the second type of transistors may both be semiconductor layers. The first type of transistors 110 may include, for example, one or more of the driving transistor T3, the bias transistor T8, the data writing transistor T2, the first light-emitting control transistor T1, the second light-emitting control transistor T6, and the second reset transistor T7 described in the above embodiments. The material of the active layer 112 of the first type of transistors may be, for example, low-temperature polysilicon, etc. The second type of transistors 120 may include, for example, one or more of the threshold compensation transistor T5 and the first reset transistor T4 described in the above embodiments. The material of the active layer 122 of the second type of transistors may be, for example, indium gallium zinc oxide. This display panel may not only have the advantages of high resolution, high response speed, high brightness, and high aperture ratio of LTPS display panels, but also have the advantage of small leakage current of IGZO.

Further, referring to FIG. 15, FIG. 15 also exemplarily illustrates the light-shielding layer M0. The light-shielding layer M0 may be, for example, located on the side of the active layer 112 of the first type of transistors adjacent to the substrate PI. It should be noted that the number of layers of the above-mentioned films and the stacking sequence are only an illustration. The position or order of the film layers may be added, deleted or adjusted based on actual needs; the materials of the above-mentioned film layers may also be other materials known to those skilled in the art; and may be selected based on the requirements of the display panel, are not limited here.

Figure 16:
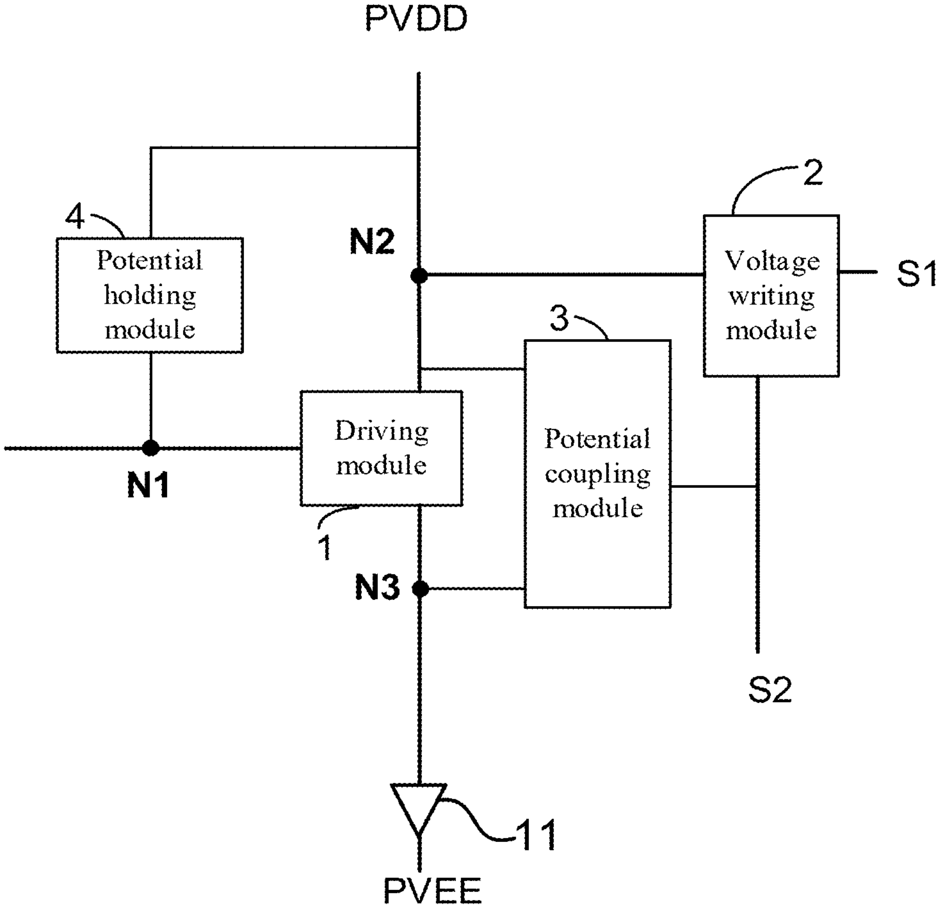
FIG. 16 illustrates another exemplary pixel driving circuit according to various disclosed embodiments of the present disclosure.

FIG. 16 is a schematic structural diagram of another exemplary pixel driving circuit according to various disclosed embodiments of the present disclosure. In some embodiments, as shown in FIG. 16, the pixel driving circuit also includes a potential holding module 4. The potential holding module 4 may be connected between the first node N1 and the second node N2. For the films used to form the potential holding module 4 and the potential coupling module 4, at least a partial number of the film layers may be arranged in the same layer.

Specifically, as shown in FIG. 16, the potential holding module 4 may include, for example, a storage capacitor Cst for storing the potential during the light-emitting stage. The first terminal of the storage capacitor Cst may be electrically connected to the first node N1, and the second terminal of the storage capacitor Cst may be electrically connected to the second node N2. The film layer used to form the potential holding module 4 may be, for example, the capacitive metal layer MC. FIG. 15 exemplarily shows the capacitive metal layer MC and the other terminal 42 of the coupling capacitor C of the potential coupling module 3, for example, the second conductive layer M2, may be disposed in a same layer. The same layer arrangement may simplify the film layer design of the display panel. There may be no need to set an additional separate film layer for the potential coupling module 3, which may reduce the cost of the display panel.

Figure 17:
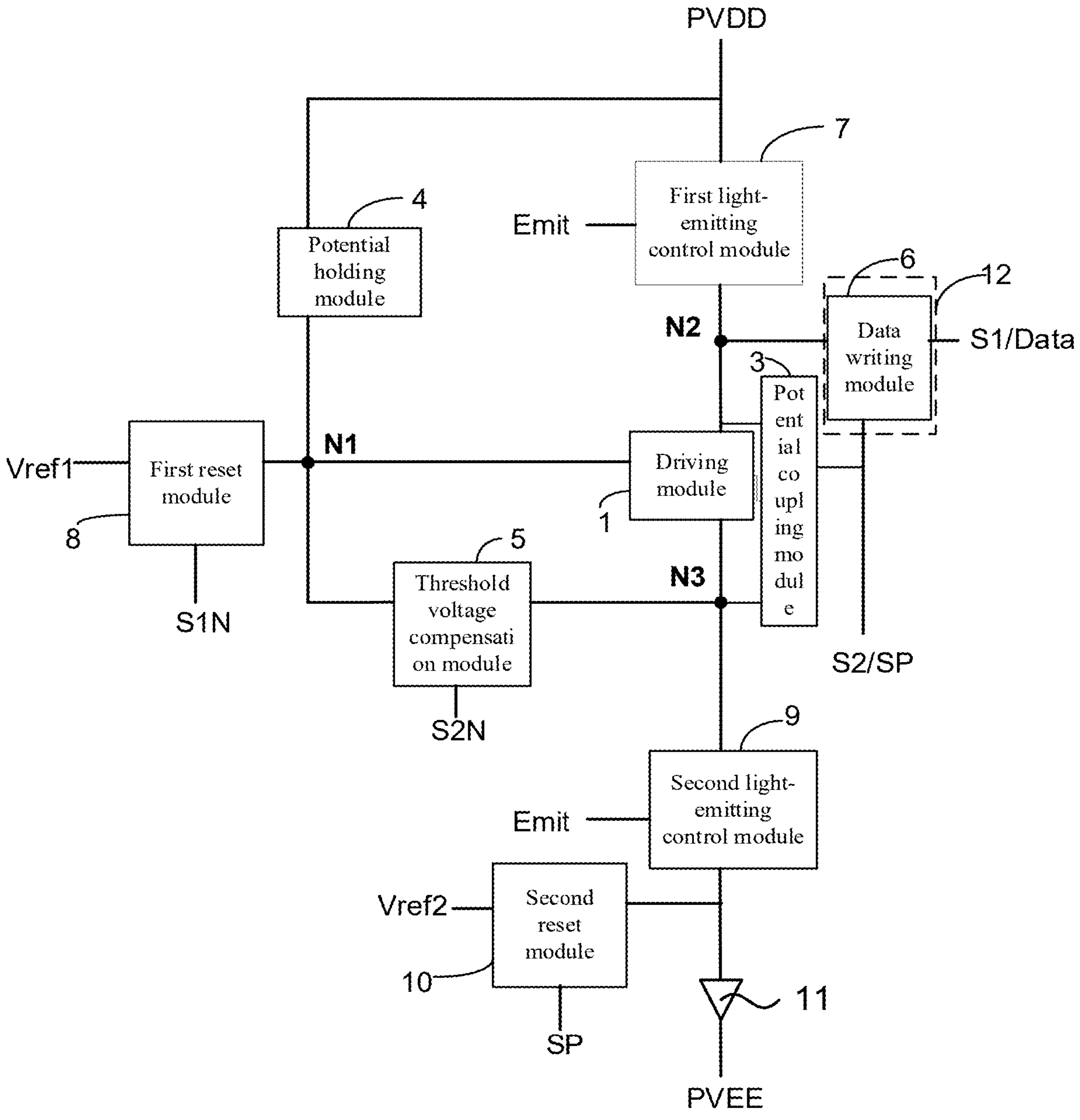
FIG. 17 illustrates another exemplary pixel driving circuit according to various disclosed embodiments of the present disclosure.

FIG. 17 is a schematic structural diagram of another exemplary pixel driving circuit according to various disclosed embodiments of the present disclosure. In some embodiments, as shown in FIG. 17, the voltage writing module 12 may at least include a data writing module 6. The pixel driving circuit may also include a threshold compensation module 5 electrically connected between the first node N1 and the third node N3, and a first light-emitting control module 7 and the potential holding module 4. The first terminal of the first light-emitting control module 7 and the first terminal of the potential holding module 4 may both be connected to the first power signal line PVDD, and the second terminal of the first light-emitting control module 7 may be electrically connected to the second node N2. The control terminal of the first light-emitting control module 7 may be electrically connected to the light-emitting control signal line Emit. The second terminal of the potential holding module 4 may be electrically connected to the first node N1. The pixel driving circuit may also include a first reset module 8. The first terminal of the first reset module 8 may be electrically connected to the first reset signal line Vref1. The second terminal of the first reset module 8 may be electrically connected to the first node N1. The control terminal of the first reset module 8 may be electrically connected to the second control signal line S1N. The pixel driving circuit may also include a second light-emitting control module 9 and a second reset module 10. The first terminal of the second light-emitting control module 9 may be electrically connected to the second node N2. The first terminal of the second reset module 10 may be electrically connected to the second reset signal line Vref2. The second terminal of the second light-emitting control module 9 and the second terminal of the second reset module 10 may be both connected to the light-emitting element 11. The control terminal of the second light-emitting control module 9 may be electrically connected to the light-emitting control signal line Emit, and the control terminal of the second reset module 10 may be electrically connected to the first control signal line S2.

Figure 18:
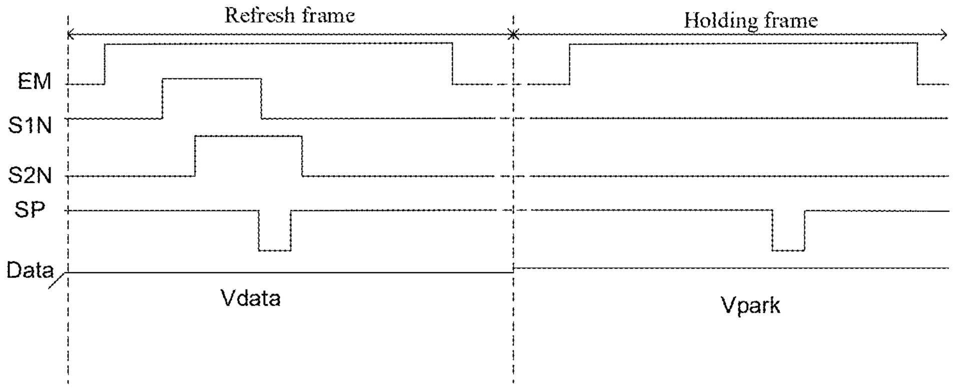
FIG. 18 illustrates an exemplary sequence diagram of the pixel driving circuit in FIG. 17.

FIG. 18 is an exemplary sequence diagram of the pixel driving circuit shown in FIG. 17 according to various disclosed embodiments of the present disclosure. Specifically, the operation process of the pixel driving circuit may be exemplified with reference to FIGS. 17-18. The refresh frame may include, for example, a reset stage, a data writing stage and a light-emitting stage. In the reset stage, the second control signal of the second control signal line S1N may control the first reset module 8 to be turned on, and the first reset signal of the first reset signal line Vref1 may be transmitted to the first reset module 8 and perform the reset operation on the first node N.

In the data writing stage, the third control signal of the third control signal line S2N may control the threshold compensation module 5 to be turned on to compensate the threshold voltage of the driving module 1; the first control signal of the first control signal line S2 may control the data writing the module 6 to be turned on; and the data signal of the data signal line Data may be transmitted to the control terminal of the driving module 1, e.g., written to the first node N1.

In the light-emitting stage, the light-emitting control signal of the light-emitting control signal line Emit may be used to control the on or off of the first light-emitting control module 7 and the second light-emitting control module 9. When the light-emitting control signal of the light-emitting control signal line Emit controls the first light-emitting control module 7 and the second light-emitting control module 9 to be turned on, the first power signal transmitted by the first power line may be transmitted to the light-emitting element 11, thereby realizing the display and lighting of the light-emitting element 11.

In the holding frame stage, the first control signal of the first control signal line S2 may control the data writing module 6 to be turned on, and the preset potential signal Vpark transmitted by the preset potential signal line S1 may be written into the second terminal of the driving module 1, e.g., the second node N2, to correct and maintain the light-emitting brightness of the light-emitting element 11 in the frame stage to reduce the flicker. To eliminate the difference in the bias effect of the light-emitting elements 11 of different colors in the frame holding stage, the first control signal may be pulled up to a high-level signal, the data writing module 6 may be turned off, and the potential coupling module 3 may be connected to the high-level signal to pull up the potential of the second node N2 and the third node N3. The pulled-up potential of the second node N2 and the third node N3 may eliminate the differences in the bias effect caused by different light-emitting elements 11 being connected to the same preset potential signal Vpark, thereby eliminating the risk of the flicker deterioration, optimizing the flicker performance of the display panel, and also improving the display effect of the display panel.

FIG. 18 exemplarily shows that the data signal of the refresh frame may be, for example, Vdata, and the preset potential signal of the retention frame may be, for example, Vpark. The potentials of Vdata and Vpark may be different.

Figure 19:
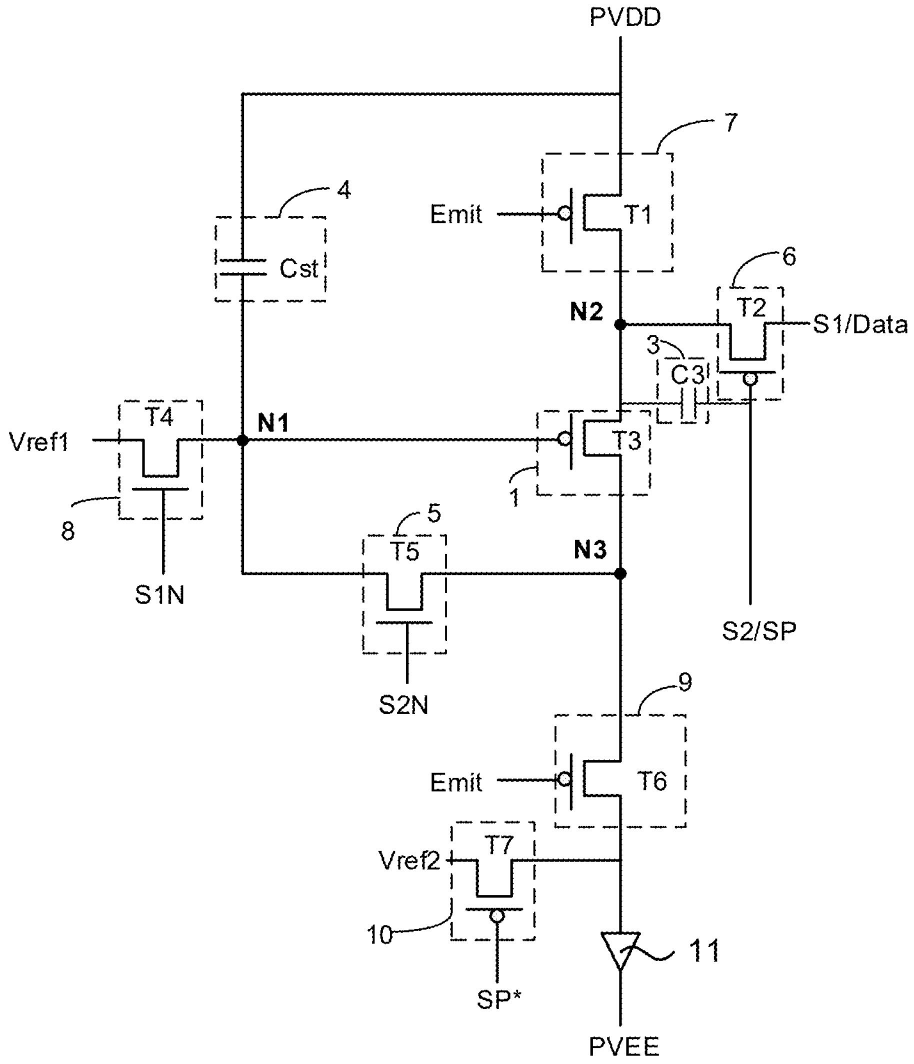
FIG. 19 illustrates another exemplary pixel driving circuit according to various disclosed embodiments of the present disclosure.

FIG. 19 is a schematic structural diagram of another exemplary pixel driving circuit according to various embodiments of the present disclosure. In one embodiment, as shown in FIG. 19, the driving module 1, the data writing module 6, the first light-emitting control module 7, the second light-emitting control module 9 and the second reset module 10 may all use low-temperature polysilicon transistors; and the threshold compensation module 5 and the first reset module 8 may use oxide transistors.

Specifically, the thin-film transistors included in the driving module 1, the data writing module 6, the first light-emitting control module 7, the second light-emitting control module 9 and the second reset module 10 may be configured to be P-type transistors as shown in FIG. 19. For example, the driving module 1 may include a driving transistor T3; the data writing module 6 may include a data writing transistor T2; the first light-emitting control module 7 may include a first light-emitting control transistor T1; and the second reset module 10 may include a second reset transistor T7. The driving transistor T3, the bias transistor T8, the data writing transistor T2, the first light-emitting control transistor T1, the second light-emitting control transistor T6 and the second reset transistor T7 may be, for example, PMOS transistors. The driving transistor T3, the bias transistor T8, the data writing transistor T2, the first light-emitting control transistor T1, the second light-emitting control transistor T6 and the second reset transistor T7 may be, for example, polysilicon transistors. The channels of the polysilicon transistors may be constructed of polysilicon. The polysilicon transistor may be a low temperature polysilicon transistor. Polysilicon transistors may have high electron mobility, accordingly, polysilicon transistors may have fast driving characteristics.

The threshold compensation module 5 may include a threshold compensation transistor T5, and the first reset module 8 may include a first reset transistor T4. The threshold compensation transistor T5 may be, for example, the NMOS transistor shown in FIG. 19. The channels of the threshold compensation transistor T5 and the first reset transistor T4 may be constructed of an oxide semiconductor. For example, the oxide semiconductor may include indium gallium zinc oxide (IGZO). Oxide semiconductor transistors may have low charge mobility compared to polysilicon. Therefore, the amount of leakage current generated in the off state of the oxide semiconductor transistor may be smaller than the amount of leakage current generated in the off state of the polysilicon transistor. Thus, by setting the threshold compensation transistor T5 and the first reset transistor T4 as oxide semiconductor transistors, such as IGZO transistors, the influence of the potential of the gate of the driving transistor T3 caused by the leakage current of the threshold compensation transistor T5 and the first reset transistor T4 may be reduced. Thus, the stability of the operation state of the driving transistor T3 may be improved, thereby improving the picture display effect of the display panel.

Figure 20:
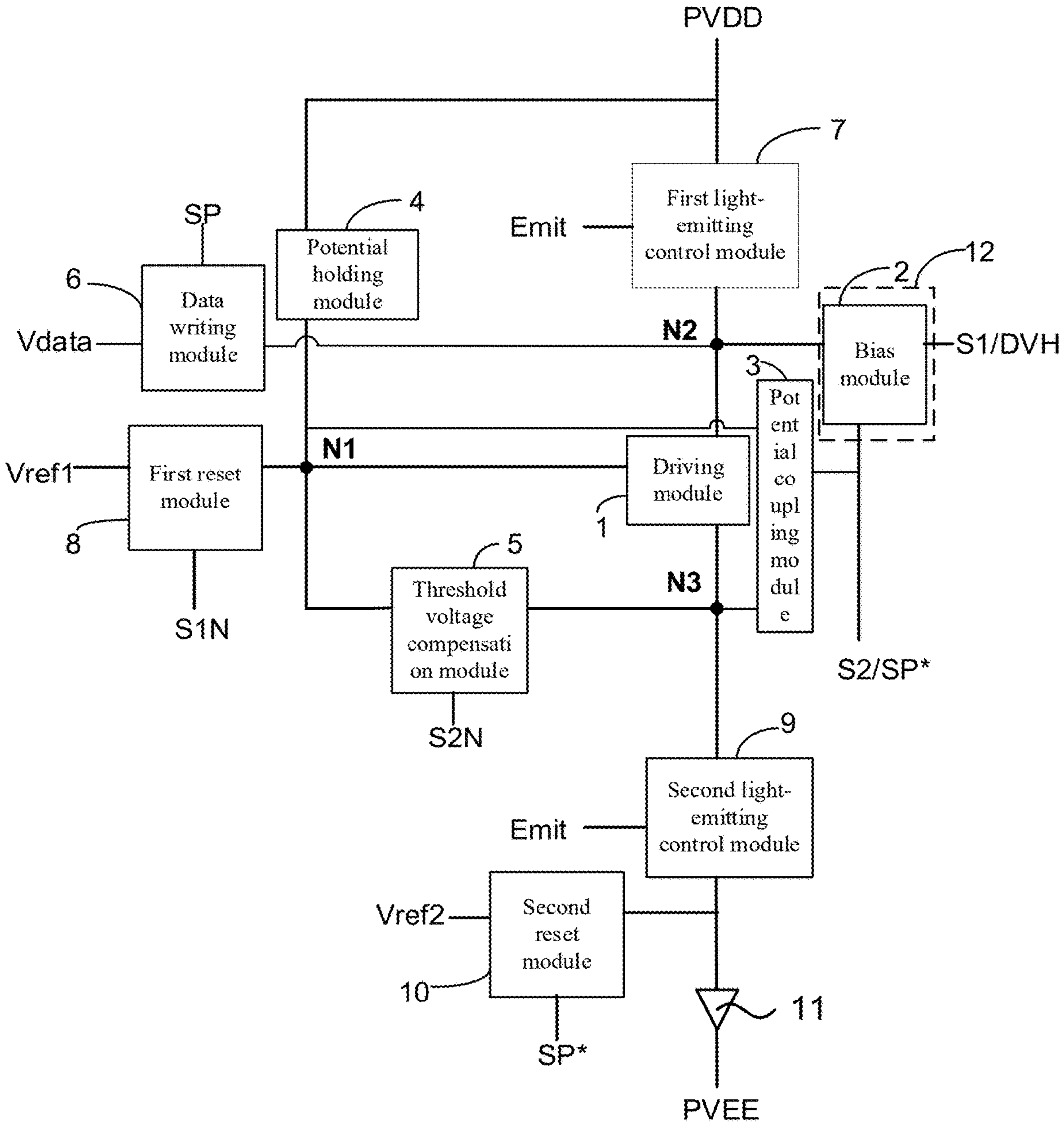
FIG. 20 illustrates another exemplary pixel driving circuit according to various disclosed embodiments of the present disclosure.

FIG. 20 is a schematic structural diagram of another exemplary pixel driving circuit provided according to various disclosed embodiments of the present disclosure. In some embodiments, as shown in FIG. 20, the voltage writing module 12 may also include a bias module 2.

Figure 21:
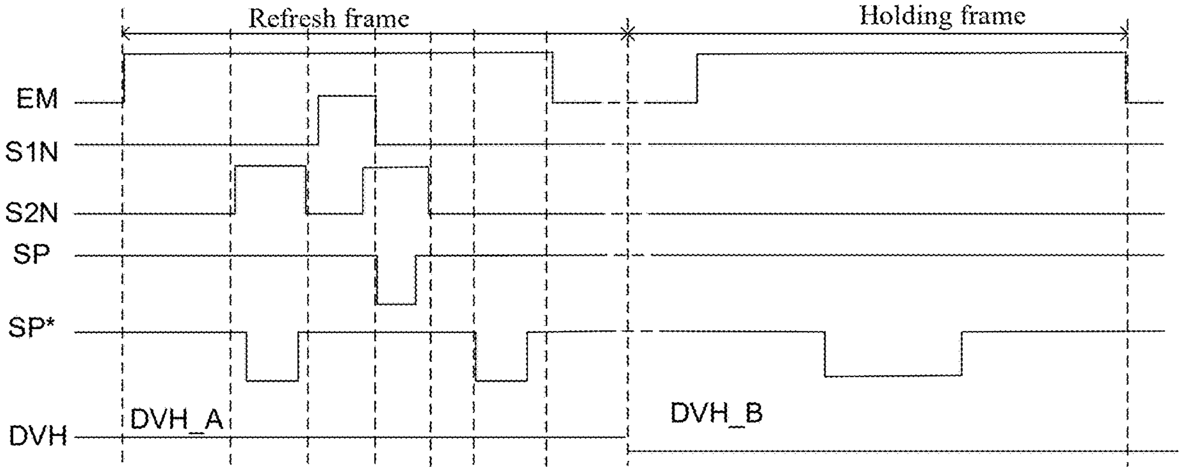
FIG. 21 illustrates an exemplary sequence diagram of the pixel driving circuit in FIG. 20.

FIG. 21 is a sequence diagram of the pixel driving circuit shown in FIG. 20. Specifically, the operation process of the pixel driving circuit may be exemplarily explained with reference to FIG. 20 and FIG. 21. The refresh frame may include, for example, a first bias stage, a reset stage, a data writing stage and a second bias stage. In the first bias stage, the bias control signal of the bias control signal line SP* may control the bias module 2 to be turned on, and when the bias module 2 is turned on, the bias adjustment of the driving module 1 may be performed. The control terminal of the threshold compensation module 5 may be electrically connected to the third control signal line S2N. The third control signal of the third control signal line S2N may control the threshold compensation module 5 to be turned on during the first bias stage such that the bias signal line DVH may be biased. The setting signal may be written into the first node N1, and the first node N1 may receive the bias control signal through the potential coupling module 3. The bias control signal may change from the high-level to the low-level in the first bias stage, and the potential of the first node N1 may be pulled down such that a lower potential bias signal may be written into the first node N1 to reset the bias state of the driving module 1. In addition, in the first bias stage, the bias control signal of the bias control signal line SP* may control the second reset module 10 to be turned on to reset the anode of the light-emitting element 11, that is, the second reset signal of the second reset signal line Vref2 may be transmitted to the anode of the light-emitting element 11 to eliminate the impact of the previous frame.

In the reset stage, the second control signal of the second control signal line S1N may control the first reset module 8 to be turned on, and the first reset signal of the first reset signal line Vref1 may be transmitted to the first reset module 8 to reset the first node N1.

In the data writing stage, the third control signal of the third control signal line S2N may control the threshold compensation module 5 to be turned on to compensate the threshold voltage of the driving module 1, the first control signal of the first control signal line S2 may control the data writing module 6 to be turned on, and the data signal of the data signal line Data may be transmitted to the control terminal of the driving module 1, e.g., written to the first node N1.

In the second bias stage, the third control signal of the third control signal line S2N may control the threshold compensation module 5 to be turned off, the bias control signal of the bias control signal line SP* may control the bias module 2 to be turned on, and the bias control signal of the bias control signal line SP* may pull down the potential of the first node N1 through the first capacitor C1, and the bias signal of the bias signal line DVH may be written into the first terminal of the driving module 1, that is, the second node N2 may be reset one more time such that a lower potential bias signal may be written into the first node N1 to reset the bias state of the driving module 1. By applying a bias voltage to the driving module 1, the problem of low-frequency flicker may be reduced.

The light-emitting control signal of the light-emitting control signal line Emit may be used to control the first light-emitting control module 7 and the second light-emitting control module 9 to be turned on or off. When the second light-emitting control module 9 is turned on, the first power signal transmitted by the first power line may be transmitted to the light-emitting element 11, thereby realizing the display and lighting of the light-emitting element 11.

In the holding frame stage, the bias control signal of the bias control signal line may control the bias module 2 to be turned on, and the bias signal transmitted by the bias signal line DVH may be written into the second terminal of the driving module 1, e.g., the second node N2, to achieve a bias effect to correct and maintain the light-emitting brightness of the light-emitting element 11 in the frame stage to reduce the screen flicker. The bias control signal transmitted by the bias control signal line may continue to switch on and off to perform the bias effect during the holding frame stage. The first control signal transmitted by the first control signal line S2 may control the data writing module 6 to be turned off, and the second control signal transmitted on the second control signal line S1N may control the first reset module 8 to be turned off, and the third control signal transmitted by the third control signal line S2N may control the second reset module 10 to be turned off. To eliminate the difference in the bias effect of the light-emitting elements 11 of different colors in the holding frame stage, the bias control signal may be pulled up to a high-level signal, the bias module 2 may be turned off, and the potential coupling module 3 may be connected to the high-level signal to pull up the potential of the second node N2 and the third node N3. The pulled-up potential of the second node N2 and the third node N3 may eliminate the difference in bias caused by different light-emitting elements 11 being connected to the same preset potential signal Vpark, thereby eliminating the risk of the flicker deterioration, optimizing the flicker performance of the display panel, and also improving the display effect of the display panel.

FIG. 21 exemplarily shows that the voltage of the bias signal in the bias stage of the refresh frame may be, for example, DVH_A, and the voltage of the bias signal of the holding frame is, for example, DVH_B. The potentials of DVH_A and DVH_B may be different.

Figure 22:
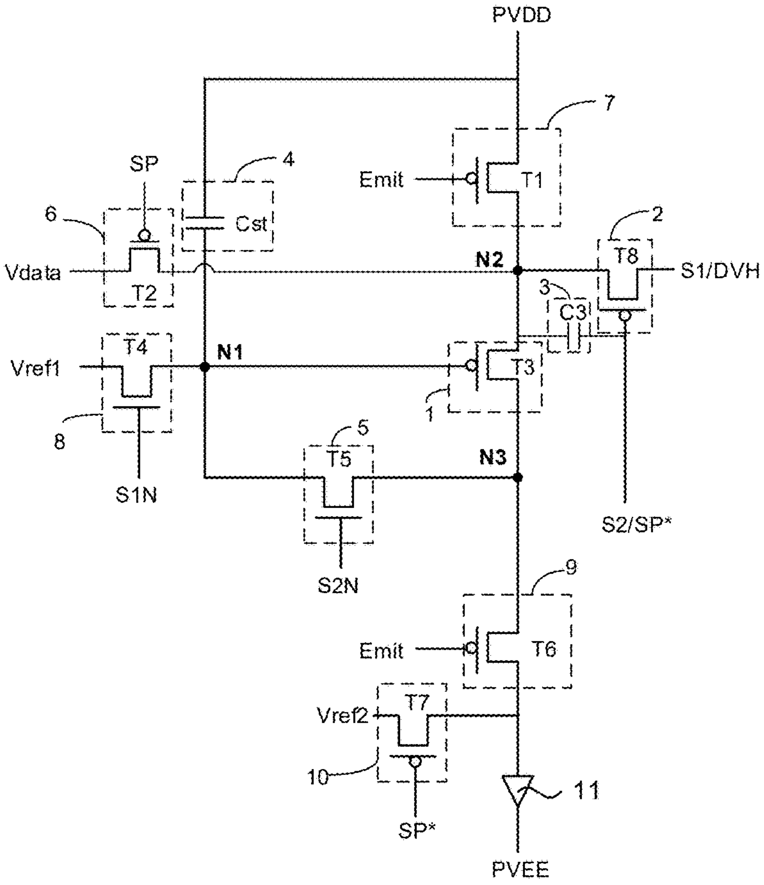
FIG. 22 illustrates another exemplary pixel driving circuit according to various disclosed embodiments of the present disclosure.

FIG. 22 is a schematic structural diagram of another exemplary pixel driving circuit according to various embodiments of the present disclosure. In some embodiments, as shown in FIG. 22, the thin-film transistors included in the driving module 1, the bias module 2, the data writing 6, the first light-emitting control module 7, the second light-emitting control module 9 and the second reset module 10 may all be P-type transistors as shown in FIG. 22. For example, the driving module 1 may include a driving transistor T3; the bias module 2 may include a bias transistor T8; the data writing module 6 may include a data writing transistor T2; the first light-emitting control module 7 may include the first light-emitting control transistor T1; and the second reset module 10 may include a second reset transistor T7. The driving transistor T3, the bias transistor T8, the data writing transistor T2, the first light-emitting control transistor T1, the second light-emitting control transistor T6 and the second reset transistor T7 may all be PMOS transistors. The driving transistor T3, the bias transistor T8, the data writing transistor T2, the first light-emitting control transistor T1, the second light-emitting control transistor T6 and the second reset transistor T7 may be, for example, polysilicon transistors. The threshold compensation module 5 may include a threshold compensation transistor T5, and the first reset module 8 may include a first reset transistor T4. The threshold compensation transistor T5 may be, for example, the NMOS transistor shown in FIG. 10. The channels of the threshold compensation transistor T5 and the first reset transistor T4 may be constructed of an oxide semiconductor.

The present disclosure also provides a display device. The display device may include a display panel as in any one of the above display panel embodiments. Therefore, the display device may include the technical features of the display panel provided by the embodiments of the present disclosure and may achieve the beneficial effects of the display panel provided by the embodiments of the present disclosure. For similarities, reference may be referred to the above description of the display panel provided by the embodiments of the present disclosure, which will not be described again.

Figure 23:
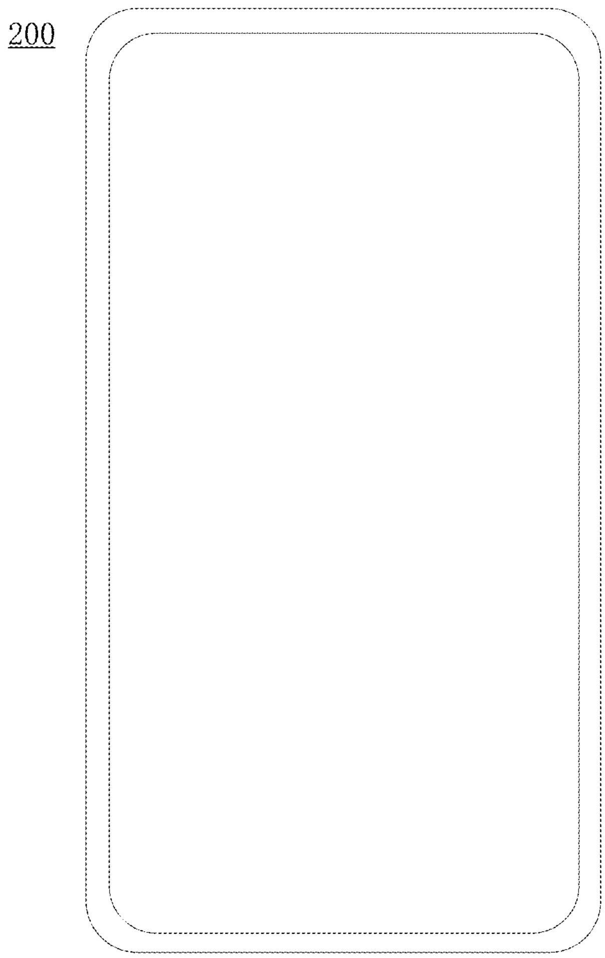
FIG. 23 illustrates an exemplary display device according to various disclosed embodiments of the present disclosure.

FIG. 23 is a schematic structural diagram of an exemplary display device according to various embodiments of the present disclosure. As shown in FIG. 23, the display device provided by one embodiment of the present disclosure may include a display panel 200. The display panel 200 may be the display panel provided by any of the above embodiments of the present disclosure. The embodiment in FIG. 23 only takes a mobile phone as an example to illustrate the display device. It can be understood that the display device provided in the embodiments of the present disclosure may be any electronic product with a display function, including but not limited to the following categories: mobile phones, televisions, notebook computers, desktop monitors, tablet computers, digital cameras, smart bracelets, smart glasses, vehicle-mounted monitors, medical equipment, industrial control equipment, or touch interactive terminals, etc. The embodiments of the present disclosure are not particularly limited.

The display device provided by the embodiment of the present disclosure includes the above-mentioned display panel, so it may also solve the same technical problems as the above-mentioned display panel embodiment and achieve the same technical effect, which will not be described again here.

It should be noted that in this article, relational terms such as "first" and "second" are only used to distinguish one entity or operation from another entity or operation, and do not necessarily require or imply any such actual relationship or sequence exists between entities or operations. Furthermore, the terms "comprises", "comprises", or any other variations thereof are intended to cover a non-exclusive inclusion such that a process, method, article, or apparatus that includes a list of elements includes not only those elements, but also those not expressly listed other elements, or elements inherent to the process, method, article or equipment. Without further limitation, an element qualified by the statement "comprises a . . . " does not exclude the presence of additional identical elements in the process, method, article, or device that includes the element.

The above are only specific embodiments of the present disclosure, enabling those skilled in the art to understand or implement the present disclosure. Various modifications to these embodiments will be readily apparent to those skilled in the art, and the generic principles defined herein may be practiced in other embodiments without departing from the spirit or scope of the disclosure. Therefore, the present disclosure is not to be limited to the embodiments herein but is to be accorded the widest scope consistent with the principles and novel features disclosed herein.

What is claimed is:

1. A pixel driving circuit, comprising:

a driving module, wherein a control terminal of the driving module is directly electrically connected to a first node, a first terminal of the driving module is directly electrically connected to a second node, and a second terminal of the driving module is directly electrically connected to a third node;

a voltage writing module, wherein a first terminal of the voltage writing module is directly electrically connected to a preset potential signal line, a second terminal of the voltage writing module is directly electrically connected to the second node, and a control terminal of the voltage writing module directly electrically connected to a first control signal line;

a potential holding module directly connected between the first node and the second node; and a potential coupling module including a coupling capacitor, wherein a first terminal of the coupling capacitor is directly electrically connected to the first control signal line, and a second terminal of the coupling capacitor is directly electrically connected to at least one of the second node and the third node.

2. The pixel driving circuit according to claim 1, wherein:

the voltage writing module includes a data writing module;

the preset potential signal line includes a data signal line;

the first control signal line includes a first scan signal line;

the potential coupling module includes a first capacitor and/or a second capacitor;

the first capacitor is directly electrically connected between the first scan signal line and the second node; and the second capacitor is directly electrically connected between the first scan signal line and the third node.

3. The pixel driving circuit according to claim 2, wherein:

the voltage writing module includes a bias module;

the preset potential signal line includes a bias signal line;

the first control signal line includes a bias voltage control signal line;

the potential coupling module includes a third capacitor; and the third capacitor is directly connected between the bias voltage control signal line and the second node.

4. A display panel, comprising:

a light-emitting element; and a plurality of pixel driving circuits electrically connected to the light-emitting element, wherein:

each of at least a partial number of the plurality of the pixel driving circuits includes:

a driving module, wherein a control terminal of the driving module is directly electrically connected to a first node, a first terminal of the driving module is directly electrically connected to a second node, and a second terminal of the driving module is directly electrically connected to a third node;

a voltage writing module, wherein a first terminal of the voltage writing module is directly electrically connected to a preset potential signal line, a second terminal of the voltage writing module is directly electrically connected to the second node, and a control terminal of the voltage writing module directly electrically connected to a first control signal line;

a potential holding module directly connected between the first node and the second node; and a potential coupling module including a coupling capacitor, wherein a first terminal of the coupling capacitor is directly electrically connected to the first control signal line, and a second terminal of the coupling capacitor is directly electrically connected to at least one of the second node and the third node.

5. The display panel according to claim 4, wherein the light-emitting element comprises:

a light-emitting element of a first color; and a light-emitting element of a second color, wherein:

the first color is different from the second color;

the pixel driving circuit includes a first pixel driving circuit and a second pixel driving circuit;

the first pixel driving circuit is directly electrically connected to the light-emitting element of the first color;

the second pixel driving circuit is directly electrically connected to the light-emitting element of the second color; and the at least partial number of the pixel driving circuits include at least the first pixel driving circuit.

6. The display panel according to claim 5, wherein the light-emitting element further comprises:

a light-emitting element of a third color, wherein:

the third color is different from the first color and the second color;

the pixel driving circuit further includes a third pixel driving circuit;

the third pixel driving circuit is electrically connected to the light-emitting element of the third color;

the at least the partial number of the pixel driving circuits further include the third pixel driving circuit;

the potential coupling module in the first pixel driving circuit has a first coupling value;

the potential coupling module in the third pixel driving circuit has a second coupling value; and the second coupling value is different from the first coupling value.

7. The display panel according to claim 6, wherein the preset potential signal line comprises:

a first potential signal line;

a second potential signal line; and a third potential signal line, wherein:

the first potential signal line is connected to the first pixel driving circuit;

the second potential signal line is connected to the second pixel driving circuit;

the third potential signal line is connected to the third pixel driving circuit;

a driving sequence of the pixel driving circuit includes a refresh frame; and in the refresh frame, the first potential signal line transmits a first potential signal, the second potential signal line transmits a second potential signal, and the third potential signal line transmits a third potential signal, and the second potential signal is lower than the first potential signal and the third potential signal.

8. The display panel according to claim 7, wherein:

the first coupling value is determined based on the second potential signal, the first potential signal, a potential change amount on the first control signal line and a parasitic capacitance of a target node;

the second coupling value is determined based on the second potential signal, the third potential signal, the potential change amount on the first control signal line and the parasitic capacitance of the target node; and the target node is a node to which the potential coupling module is connected.

9. The display panel according to claim 8, wherein:

the first coupling value is C1, and satisfies:

$$C1 = \frac{(\text{Data1} - \text{Data2}) \times \text{CNX\_1}}{Vgh - Vg1},$$

wherein Data2 represents the second potential signal, Data1 represents the first potential signal, Vgh–Vgl represents the potential change amount on the first control signal line, and CNX_1 represents the parasitic capacitance of the target node in the first pixel driving circuit.

10. The display panel according to claim 8, wherein:

the first coupling value is C1, and satisfies:

$$0 < C1 < \frac{(\text{Data1} - \text{Data2}) \times \text{CN2\_1}}{(Vgh - Vgl)} + \frac{(\text{Data1} - \text{Data2}) \times \text{CN3\_1}}{(Vgh - Vgl)},$$

wherein Data2 represents the second potential signal, Data1 represents the first potential signal, Vgh–Vgl represents the potential change amount on the first control signal line, CN2_1 represents the parasitic capacitance of the second node in the first pixel driving circuit, and CN3_1 represents the parasitic capacitance of the third node in the pixel driving circuit.

11. The display panel according to claim 8, wherein:

the second coupling value is C2, and satisfies:

$$C2 = \frac{(\text{Data3} - \text{Data2}) \times \text{CNX\_3}}{(Vgh - Vgl)},$$

wherein Data2 represents the second potential signal, Data3 represents the third potential signal, Vgh–Vgl represents the potential change amount on the first control signal line, and CNX_3 represents the parasitic capacitance of the target node in the third pixel driving circuit.

12. The display panel according to claim 8, wherein:

the second coupling value is C2, and satisfies:

$$0 < C2 < \frac{(\text{Data3} - \text{Data2}) \times \text{CN2\_3}}{(Vgh - Vgl)} + \frac{(\text{Data3} - \text{Data2}) \times \text{CN3\_3}}{(Vgh - Vgl)},$$

wherein Data2 represents the second potential signal, Data3 represents the third potential signal, Vgh–Vgl represents the potential change amount on the first control signal line, CN2_3 represents the parasitic capacitance of the second node in the third pixel driving circuit, and CN3_3 represents the parasitic capacitance of the third node in the pixel driving circuit.

13. The display panel according to claim 6, wherein:

the first color is red;

the second color is blue; and the third color is green.

14. The display panel according to claim 4, further comprising:

a base substrate, wherein:

the pixel driving circuit further includes a first conductive layer and a second conductive layer located on one side of the base substrate, and the second conductive layer is located on a side of the first conductive layer facing away from the base substrate;

transistors in the pixel driving circuit include a first type of transistors and a second type of transistors, and a material of an active layer of the first type of transistors is different from a material of an active layer of the second type of transistors;

the first conductive layer includes one terminal of the coupling capacitor and a gate of the first type of transistors; and the second conductive layer includes another terminal of the coupling capacitor, one terminal of the potential holding module in the pixel driving circuit, a gate of the second type of transistors, the active layer of the second type of transistors, or a source/drain of the first type of transistors and the second type of transistors.

15. The display panel according to claim 4, wherein at least a partial number of film layers used to form the potential holding module and film layers used to form the potential coupling module are arranged on a same layer.

16. The display panel according to claim 4, wherein the voltage writing module at least comprises:

a data writing module, wherein the pixel driving circuit also includes:

a threshold compensation module electrically connected between the first node and the third node;

a first light-emitting control module, wherein a first terminal of the first light-emitting control module and a first terminal of the potential holding module are both connected to a first power signal line, a second terminal of the first light-emitting control module electrically connected to the second node, a control terminal of the first light-emitting control module is electrically connected to a light-emitting control signal line, and a second terminal of the potential holding module is electrically connected to the first node;

a first reset module, wherein a first terminal of the first reset module is electrically connected to a first reset signal line, a second terminal of the first reset module is electrically connected to the first node, and a control terminal of the first reset module is electrically connected to a second control signal line; and a second light-emitting control module and a second reset module, wherein a first terminal of the second light-emitting control module is electrically connected to the second node, a first terminal of the second reset module is electrically connected to a second reset signal line, a second terminal of the second light-emitting control module and a second terminal of the second reset module are both connected to the light-emitting element, a control terminal of the second light-emitting control module is electrically connected to the light-emitting control signal line, and a control terminal of the second reset module is electrically connected to the first control signal line.

17. The display panel according to claim 16, wherein the voltage writing module further comprises:

a bias module.

18. A display device, comprising:

a display panel including a light-emitting element; and a plurality of pixel driving circuits electrically connected to the light-emitting element, wherein each of at least a partial number of the plurality of the pixel driving circuits includes:

a driving module, wherein a control terminal of the driving module is directly electrically connected to a first node, a first terminal of the driving module is directly electrically connected to a second node, and a second terminal of the driving module is directly electrically connected to a third node;

a voltage writing module, wherein a first terminal of the voltage writing module is directly electrically connected to a preset potential signal line, a second terminal of the voltage writing module is directly electrically connected to the second node, and a control terminal of the voltage writing module directly electrically connected to a first control signal line;

a potential holding module directly connected between the first node and the second node; and a potential coupling module including a coupling capacitor, wherein a first terminal of the coupling capacitor is directly electrically connected to the first control signal line, and a second terminal of the coupling capacitor is directly electrically connected to at least one of the second node and the third node.

* * * * *